US011716296B2

(12) United States Patent
Bradley et al.

(10) Patent No.: US 11,716,296 B2
(45) Date of Patent: Aug. 1, 2023

(54) SYSTEMS AND METHODS FOR TRANSFERRING MESSAGING TO AUTOMATION

(71) Applicant: LIVEPERSON, INC., New York, NY (US)

(72) Inventors: Joe Bradley, Seattle, WA (US); Alan Gilchrest, Bellevue, WA (US); Ravikiran Chittari, Cupertino, CA (US); Bodhi Deb, Seattle, WA (US)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 17/352,020

(22) Filed: Jun. 18, 2021

(65) Prior Publication Data

US 2021/0336905 A1    Oct. 28, 2021

Related U.S. Application Data

(63) Continuation of application No. 16/987,779, filed on Aug. 7, 2020, now Pat. No. 11,070,497.

(60) Provisional application No. 62/883,994, filed on Aug. 7, 2019.

(51) Int. Cl.
*H04L 51/02* (2022.01)
*G06F 40/30* (2020.01)

(52) U.S. Cl.
CPC .............. *H04L 51/02* (2013.01); *G06F 40/30* (2020.01)

(58) Field of Classification Search
CPC ....... H04L 51/02; H04L 51/14; H04L 51/214; G06F 40/30
See application file for complete search history.

(56) References Cited

U.S. PATENT DOCUMENTS

| | | | |
|---|---|---|---|
| 11,070,497 B2 | 7/2021 | Bradley et al. | |
| 2016/0110422 A1 | 4/2016 | Roytman et al. | |
| 2017/0111509 A1* | 4/2017 | McGann | H04M 3/5238 |
| 2018/0054464 A1* | 2/2018 | Zhang | H04L 51/02 |
| 2018/0101533 A1 | 4/2018 | Robichaud | |
| 2018/0183737 A1 | 6/2018 | Subbarayan | |
| 2018/0300399 A1 | 10/2018 | Blandin et al. | |
| 2018/0322403 A1* | 11/2018 | Ron | G06Q 10/10 |
| 2019/0104093 A1 | 4/2019 | Lim et al. | |
| 2019/0140986 A1 | 5/2019 | Anderson et al. | |
| 2019/0199658 A1 | 6/2019 | Kim et al. | |
| 2020/0259891 A1* | 8/2020 | Abraham | H04L 67/1008 |
| 2020/0342874 A1 | 10/2020 | Teserra | |

OTHER PUBLICATIONS

International Search Report and Written Opinion for PCT Application No. PCT/US2020/045367 dated Nov. 16, 2020, 12 pages.
Notice of Allowance dated Mar. 22, 2021 for U.S. Appl. No. 16/987,779, 10 pages.

* cited by examiner

*Primary Examiner* — Soe Hlaing
(74) *Attorney, Agent, or Firm* — Polsinelli LLP

(57) ABSTRACT

The present disclosure relates generally to facilitating routing of communications. More specifically, techniques are provided to dynamically transfer messaging between a network device and a terminal device to a type of bot based on intents identified from the messaging. Further, techniques are provided to track performance of the selected type of bot during automation.

21 Claims, 19 Drawing Sheets

SYSTEMS AND METHODS FOR TRANSFERRING MESSAGING TO AUTOMATION

CROSS-REFERENCE TO RELATED APPLICATIONS

This application is a continuation of U.S. patent application Ser. No. 16/987,779, filed Aug. 7, 2020, which claims the benefit of U.S. Provisional Patent Application No. 62/883,994, filed Aug. 7, 2019, all of which are hereby incorporated by reference in their entirety.

FIELD

The present disclosure relates generally to facilitating routing of communications. More specifically, techniques are provided to dynamically transfer messaging between a network device and a terminal device to a bot and to track performance of the bot during automation.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Certain embodiments of the present disclosure include a computer-implemented method. The method may include receiving a request for a conversation. The method may further include determining an intent for the conversation. The intent may be determined from the request. The method may further include, based on the intent, automatically providing an option to transfer the conversation to a bot. When the option is selected, the conversation with the bot may be facilitated. The method may further include receiving feedback on the conversation. The method may further include applying the feedback to a model that is used to determine a future intent associated with one or more future requests.

Certain embodiments of the present disclosure include a system. The system may include one or more data processors; and a non-transitory computer-readable storage medium containing instructions which, when executed on the one or more data processors, cause the one or more data processors to perform the methods described above and herein.

Certain embodiments of the present disclosure include a computer-program product tangibly embodied in a non-transitory machine-readable storage medium, including instructions configured to cause a data processing apparatus to perform the methods described above and herein.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment. It is understood that various changes can be made in the function and arrangement of elements without departing from the spirit and scope as set forth in the appended claims.

Figure 1:
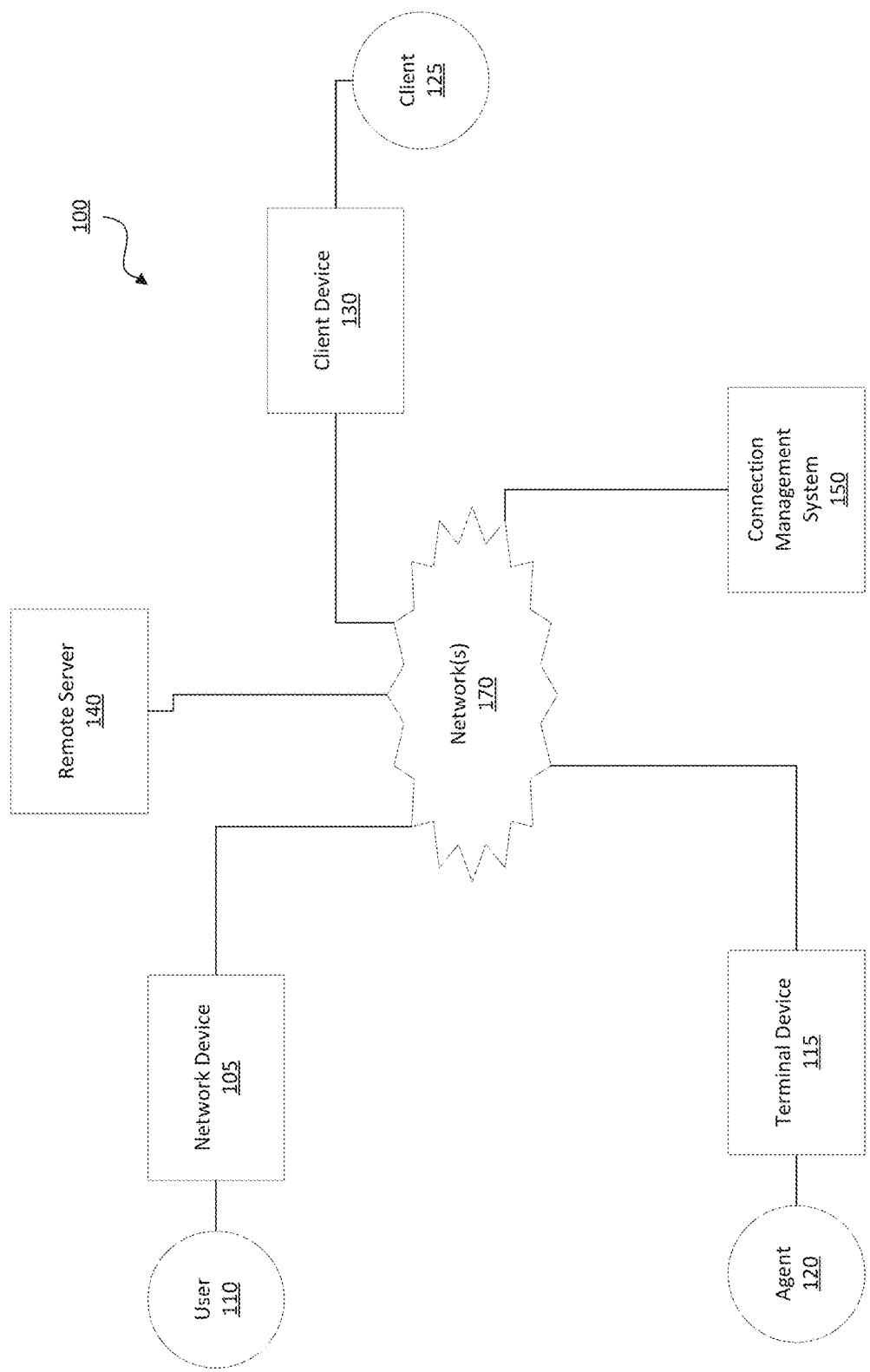
FIG. 1 shows a block diagram of an embodiment of a network interaction system.

FIG. 1 shows a block diagram of an embodiment of a network interaction system 100 which implements and supports certain embodiments and features described herein. Certain embodiments relate to establishing a connection channel between a network device 105 (which can be operated by a user 110) and a terminal device 115 (which can be operated by an agent 120). In certain embodiments, the network interaction system 100 can include a client device 130 associated with a client 125.

In certain embodiments, a user 110 can be an individual browsing a web site or accessing an online service provided by a remote server 140. A client 125 can be an entity that provides, operates, or runs the web site or the online service, or individuals employed by or assigned by such an entity to perform the tasks available to a client 125 as described herein. The agent 120 can be an individual, such as a support agent tasked with providing support or information to the user 110 regarding the website or online service. Out of a large number of agents, a subset of agents may be appropriate for providing support or information for a particular client 125. The agent 120 may be affiliated or not affiliated with the client 125. Each agent can be associated with one or more clients 125. In some non-limiting examples, a user 110 can be an individual shopping an online store from a personal computing device, a client 125 can be a company that sells products online, and an agent 120 can be a representative employed by the company. In various embodiments, the user 110, client 125, and agent 120 can be other individuals or entities.

While FIG. 1 shows only a single network device 105, terminal device 115 and client device 130, an interaction system 100 can include multiple or many (e.g., tens, hundreds or thousands) of each of one or more of these types of devices. Similarly, while FIG. 1 shows only a single user 110, agent 120 and client 125, an interaction system 100 can include multiple or many of each of one or more of such entities. Thus, it may be necessary to determine which terminal device is to be selected to communicate with a given network device. Further complicating matters, a remote server 140 may also be configured to receive and respond to select network-device communications.

A connection management system 150 can facilitate strategic routing of communications. A communication can include a message with content (e.g., defined based on input from an entity, such as typed or spoken input). The communication can also include additional data, such as data about a transmitting device (e.g., an IP address, account identifier, device type and/or operating system); a destination address; an identifier of a client; an identifier of a webpage or webpage element (e.g., a webpage or webpage element being visited when the communication was generated or otherwise associated with the communication) or online history data; a time (e.g., time of day and/or date); and/or destination address. Other information can be included in the communication. In some instances, connection management system 150 routes the entire communication to another device. In some instances, connection management system 150 modifies the communication or generates a new communication (e.g., based on the initial communication). The new or modified communication can include the message (or processed version thereof), at least some (or all) of the additional data (e.g., about the transmitting device, webpage or online history and/or time) and/or other data identified by connection management system 150 (e.g., account data associated with a particular account identifier or device). The new or modified communication can include other information as well.

Part of strategic-routing facilitation can include establishing, updating and using one or more connection channels between network device 105 and one or more terminal devices 115. For example, upon receiving a communication from network device 105, connection management system 150 can first estimate to which client (if any) the communication corresponds. Upon identifying a client, connection management system 150 can identify a terminal device 115 associated with the client for communication with network device 105. In some instances, the identification can include evaluating a profile of each of a plurality of agents (or experts or delegates), each agent (e.g., agent 120) in the plurality of agents being associated with a terminal device (e.g., terminal device 115). The evaluation can relate to a content in a network-device message. The identification of the terminal device 115 can include a technique described, for example, in U.S. application Ser. No. 12/725,799, filed on Mar. 17, 2010, which is hereby incorporated by reference in its entirety for all purposes.

In some instances, connection management system 150 can determine whether any connection channels are established between network device 105 and a terminal device associated with the client (or remote server 140) and, if so, whether such channel is to be used to exchange a series of communications including the communication.

Upon selecting a terminal device 115 to communicate with network device 105, connection management system 150 can establish a connection channel between the network device 105 and terminal device 115. In some instances, connection management system 150 can transmit a message to the selected terminal device 115. The message may request an acceptance of a proposed assignment to communicate with a network device 105 or identify that such an assignment has been generated. The message can include information about network device 105 (e.g., IP address, device type, and/or operating system), information about an associated user 110 (e.g., language spoken, duration of having interacted with client, skill level, sentiment, and/or topic preferences), a received communication, code (e.g., a clickable hyperlink) for generating and transmitting a communication to the network device 105, and/or an instruction to generate and transmit a communication to network device 105.

In one instance, communications between network device 105 and terminal device 115 can be routed through connection management system 150. Such a configuration can allow connection management system 150 to monitor the communication exchange and to detect issues (e.g., as defined based on rules) such as non-responsiveness of either device or extended latency. Further, such a configuration can facilitate selective or complete storage of communications, which may later be used, for example, to assess a quality of a communication exchange and/or to support learning to update or generate routing rules so as to promote particular post-communication targets.

In some embodiments, connection management system 150 can monitor the communication exchange in real-time and perform automated actions (e.g., rule-based actions) based on the live communications. For example, when connection management system 150 determines that a communication relates to a particular item (e.g., product), connection management system 150 can automatically transmit an additional message to terminal device 115 containing additional information about the item (e.g., quantity of item available, links to support documents related to the item, or other information about the item or similar items).

In one instance, a designated terminal device 115 can communicate with network device 105 without relaying communications through connection management system 150. One or both devices 105, 115 may (or may not) report particular communication metrics or content to connection management system 150 to facilitate communication monitoring and/or data storage.

As mentioned, connection management system 150 may route select communications to a remote server 140. Remote server 140 can be configured to provide information in a predetermined manner. For example, remote server 140 may access defined one or more text passages, voice recording and/or files to transmit in response to a communication. Remote server 140 may select a particular text passage, recording or file based on, for example, an analysis of a received communication (e.g., a semantic or mapping analysis).

Routing and/or other determinations or processing performed at connection management system 150 can be performed based on rules and/or data at least partly defined by or provided by one or more client devices 130. For example, client device 130 may transmit a communication that identifies a prioritization of agents, terminal-device types, and/or topic/skill matching. As another example, client device 130 may identify one or more weights to apply to various variables potentially impacting routing determinations (e.g., language compatibility, predicted response time, device type and capabilities, and/or terminal-device load balancing). It will be appreciated that which terminal devices and/or agents are to be associated with a client may be dynamic. Communications from client device 130 and/or terminal devices 115 may provide information indicating that a given terminal device and/or agent is to be added or removed as one associated with a client. For example, client device 130 can transmit a communication with IP address and an indication as to whether a terminal device with the address is to be added or removed from a list identifying client-associated terminal devices.

Each communication (e.g., between devices, between a device and connection management system 150, between remote server 140 and connection management system 150 or between remote server 140 and a device) can occur over one or more networks 170. Any combination of open or closed networks can be included in the one or more networks 170. Examples of suitable networks include the Internet, a personal area network, a local area network (LAN), a wide area network (WAN), or a wireless local area network (WLAN). Other networks may be suitable as well. The one or more networks 170 can be incorporated entirely within or can include an intranet, an extranet, or a combination thereof. In some instances, a network in the one or more networks 170 includes a short-range communication channel, such as a Bluetooth or a Bluetooth Low Energy channel. In one embodiment, communications between two or more systems and/or devices can be achieved by a secure communications protocol, such as secure sockets layer (SSL) or transport layer security (TLS). In addition, data and/or transactional details may be encrypted based on any convenient, known, or to be developed manner, such as, but not limited to, Data Encryption Standard (DES), Triple DES, Rivest-Shamir-Adleman encryption (RSA), Blowfish encryption, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RCS, etc.

A network device 105, terminal device 115 and/or client device 130 can include, for example, a portable electronic device (e.g., a smart phone, tablet, laptop computer, or smart wearable device) or a non-portable electronic device (e.g., one or more desktop computers, smart appliances, servers, and/or processors). Connection management system 150 can be separately housed from network, terminal and client devices or may be part of one or more such devices (e.g., via installation of an application on a device). Remote server 140 may be separately housed from each device and connection management system 150 and/or may be part of another device or system. While each device, server and system in FIG. 1 is shown as a single device, it will be appreciated that multiple devices may instead be used. For example, a set of network devices can be used to transmit various communications from a single user, or remote server 140 may include a server stack.

A software agent or application may be installed on and/or executable on a depicted device, system or server. In one instance, the software agent or application is configured such that various depicted elements can act in complementary manners. For example, a software agent on a device can be configured to collect and transmit data about device usage to a separate connection management system, and a software application on the separate connection management system can be configured to receive and process the data.

Figure 2:
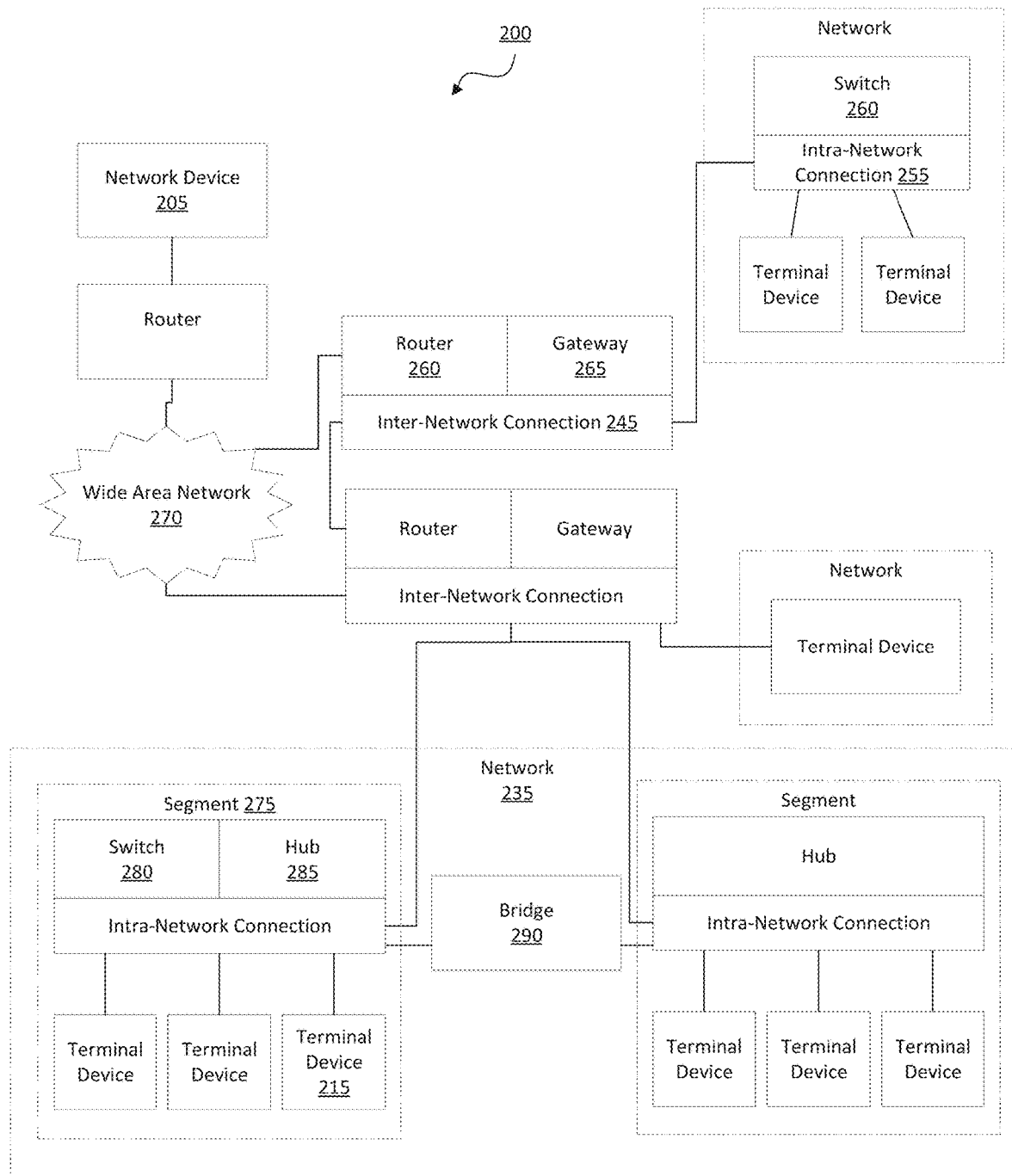
FIG. 2 shows a block diagram of another embodiment of a network interaction system.

FIG. 2 shows a block diagram of another embodiment of a network interaction system 200. Generally, FIG. 2 illustrates a variety of components configured and arranged to enable a network device 205 to communicate with one or more terminal devices 215. The depicted instance includes nine terminal devices 215 included in three local-area networks 235.

In some instances, a communication from network device 205 includes destination data (e.g., a destination IP address) that at least partly or entirely indicates which terminal device is to receive the communication. Network interaction system 200 can include one or more inter-network connection components 240 and/or one or more intra-network connection components 255 that can process the destination data and facilitate appropriate routing.

Each inter-network connection components 245 can be connected to a plurality of networks 235 and can have multiple network cards installed (e.g., each card connected to a different network). For example, an inter-network connection component 245 can be connected to a wide-area network 270 (e.g., the Internet) and one or more local-area networks 235. In the depicted instance, in order for a communication to be transmitted from network device 205 to any of the terminal devices, in the depicted system, the communication must be handled by multiple inter-network connection components 245.

When an inter-network connection component 245 receives a communication (or a set of packets corresponding to the communication), inter-network connection component 245 can determine at least part of a route to pass the communication to a network associated with a destination. The route can be determined using, for example, a routing table (e.g., stored at the router), which can include one or more routes that are pre-defined, generated based on an incoming message (e.g., from another router or from another device) or learned.

Examples of inter-network connection components 245 include a router 260 and a gateway 265. An inter-network connection component 245 (e.g., gateway 265) may be configured to convert between network systems or protocols. For example, gateway 265 may facilitate communication between Transmission Control Protocol/Internet Protocol (TCP/IP) and Internetwork Packet Exchange/Sequenced Packet Exchange (IPX/SPX) devices.

Upon receiving a communication at a local-area network 235, further routing may still need to be performed. Such intra-network routing can be performed via an intra-network connection component 255, such as a switch 280 or hub 285. Each intra-network connection component 255 can be connected to (e.g., wirelessly or wired, such as via an Ethernet cable) multiple terminal devices 215. Hub 285 can be configured to repeat all received communications to each device to which it is connected. Each terminal device can then evaluate each communication to determine whether the terminal device is the destination device or whether the communication is to be ignored. Switch 280 can be configured to selectively direct communications to only the destination terminal device.

In some instances, a local-area network 235 can be divided into multiple segments, each of which can be associated with independent firewalls, security rules and network protocols. An intra-network connection component 255 can be provided in each of one, more or all segments to facilitate intra-segment routing. A bridge 280 can be configured to route communications across segments 275.

To appropriately route communications across or within networks, various components analyze destination data in the communications. For example, such data can indicate which network a communication is to be routed to, which device within a network a communication is to be routed to or which communications a terminal device is to process (versus ignore). However, in some instances, it is not immediately apparent which terminal device (or even which network) is to participate in a communication from a network device.

To illustrate, a set of terminal devices may be configured so as to provide similar types of responsive communications. Thus, it may be expected that a query in a communication from a network device may be responded to in similar manners regardless to which network device the communication is routed. While this assumption may be true at a high level, various details pertaining to terminal devices can give rise to particular routings being advantageous as compared to others. For example, terminal devices in the set may differ from each other with respect to (for example) which communication channels are supported, geographic and/or network proximity to a network device and/or characteristics of associated agents (e.g., knowledge bases, experience, languages spoken, availability, general personality or sentiment, etc.). Accordingly, select routings may facilitate faster responses that more accurately and/or completely respond to a network-device communication. A complication is that static routings mapping network devices to terminal devices may fail to account for variations in communication topics, channel types, agent availability, and so on.

Figure 3A:
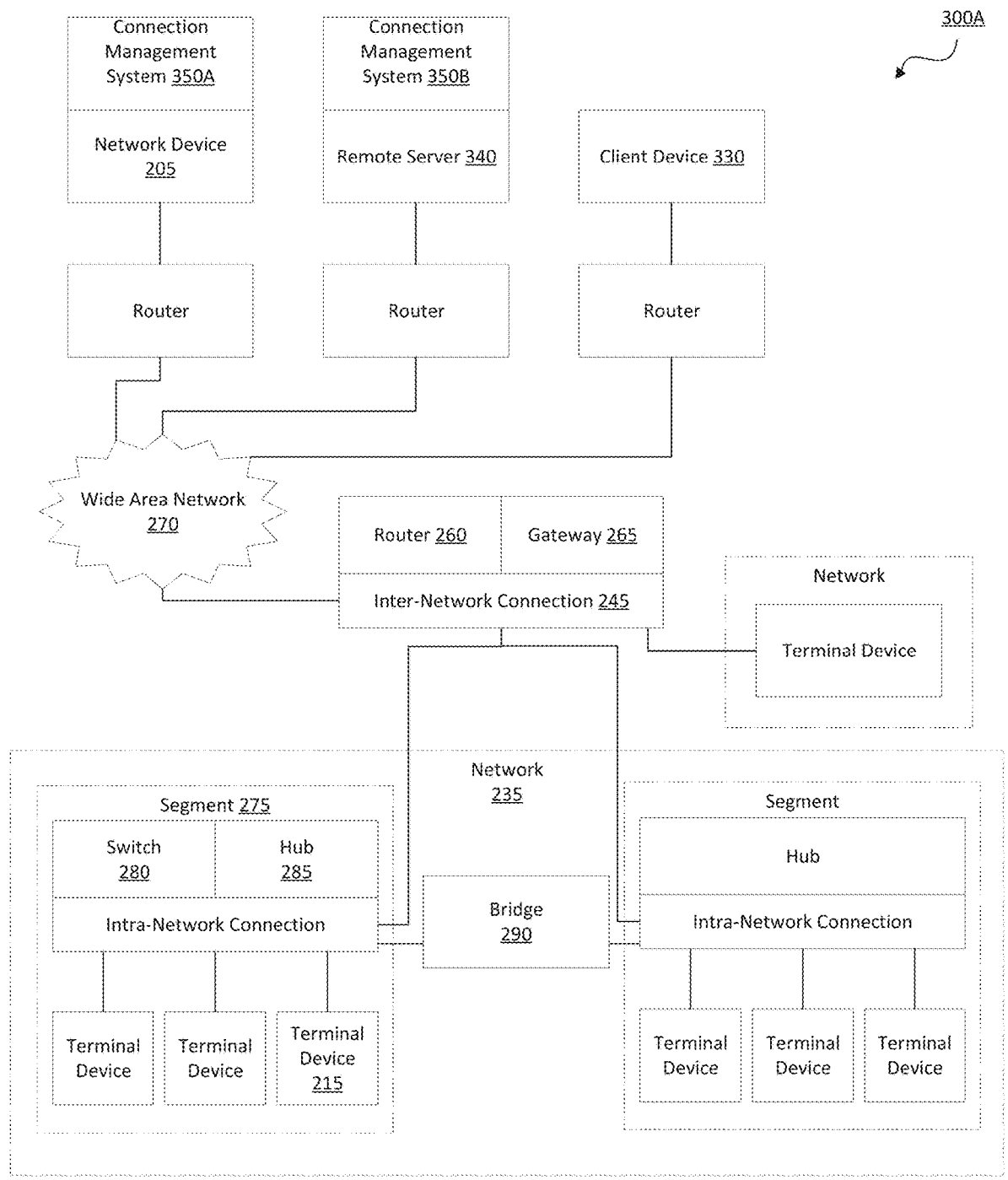
FIGS. 3A-3C show block diagrams of other embodiments of a network interaction system that includes a connection management system.
Figure 3B:
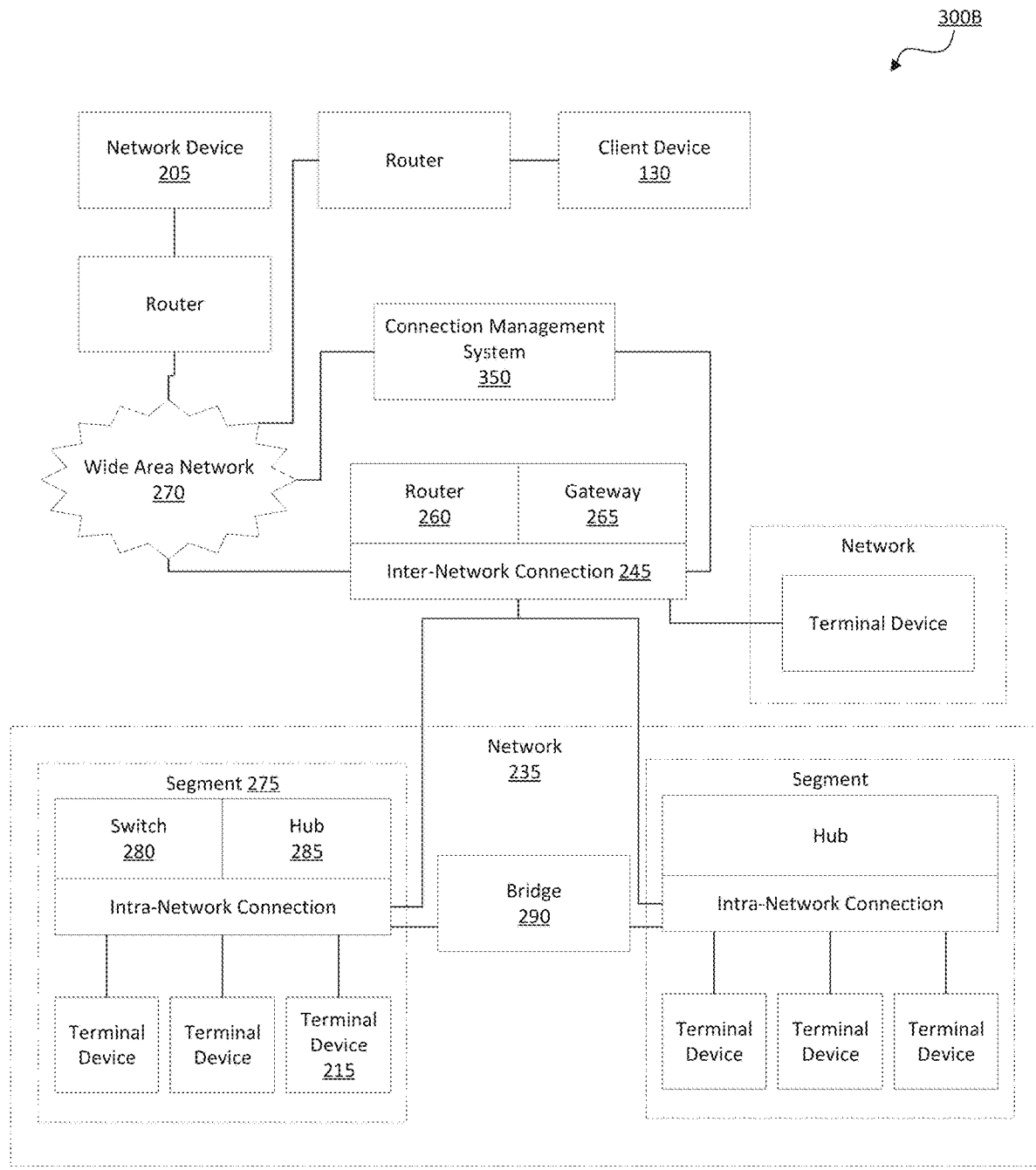
Figure 3C:
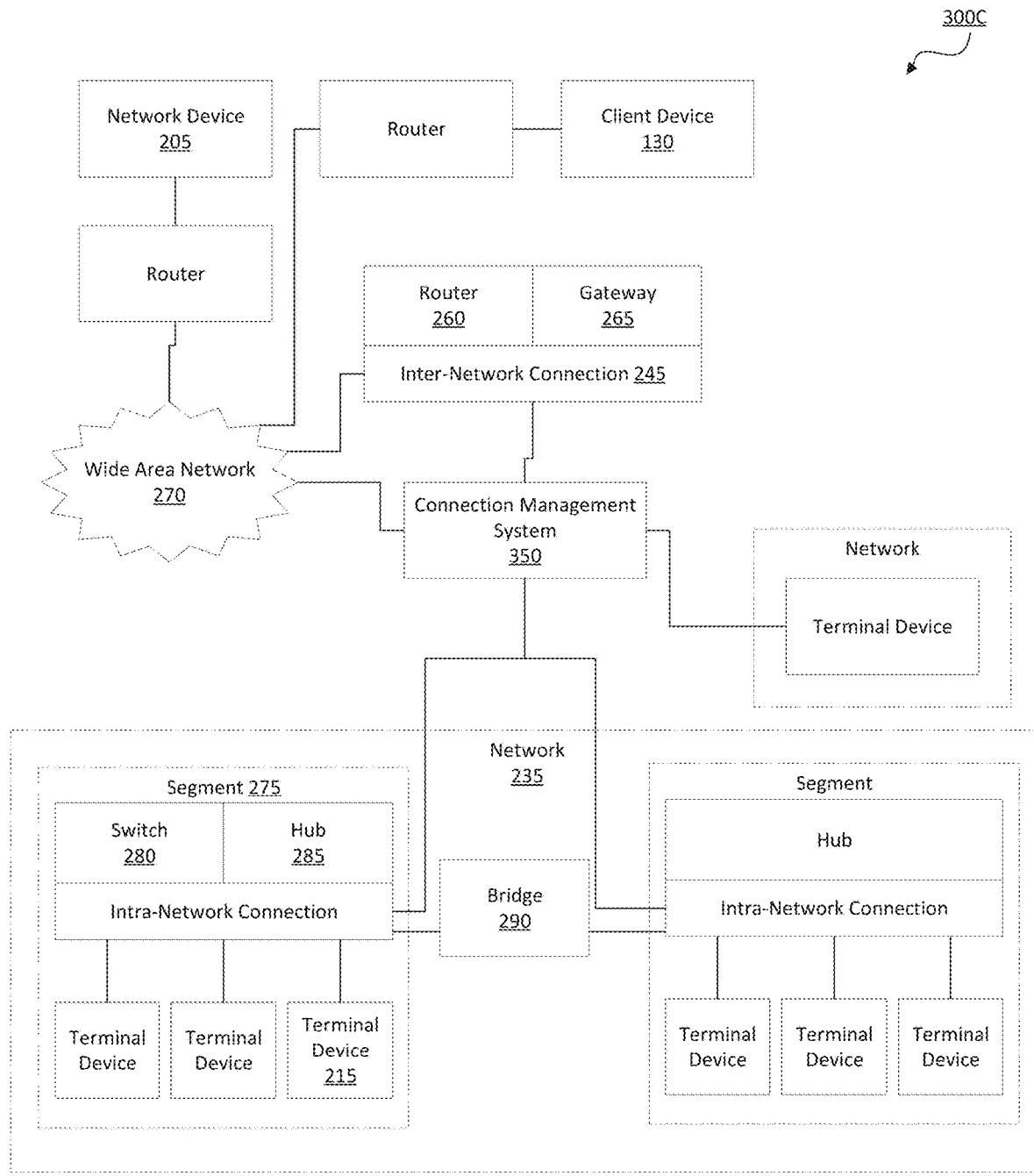

FIGS. 3A-3C show block diagrams of other embodiments of a network interaction system 300*a-c* that includes a connection management system. Each of the depicted systems 300*a-c* show only 2 local-area networks 235 for simplicity, though it can be appreciated that embodiments can be extended to expand the number of local-area networks. Each of systems 300A-C include a connection management system 350, which can identify which terminal device is to communicate with network device 205, can establish and manage (e.g., maintain or close) connection channels, can determine whether and when to re-route communications in an exchange, and so on. Thus, connection management system 350 can be configured to dynamically, and in real-time, evaluate communications, agent availability, capabilities of terminal devices or agents, and so on, to influence routing determinations.

In FIG. 3A, connection management system 350 is associated with each of network device 205 and a remote server 340 (e.g., connection management system 350*a* is associated with network device 205 and connection management system 350*b* is associated with remote server 340). For example, connection management system 350*a* and/or connection management system 350*b* can be installed or stored as an application on each of network device 205 and remote server 340, respectively. Execution of the application(s) can facilitate, for example, a communication between network device 205 and remote server 340 to identify a terminal device 215 selected to participate in a communication exchange with network device 205. The identification can be made based on one or more factors disclosed herein (e.g., availability, matching between a communication's topic/level of detail with agents' or terminal devices' knowledge bases, predicted latency, channel-type availability, and so on).

A client device 330 can provide client data indicating how routing determinations are to be made. For example, such data can include: indications as to how particular characteristics are to be weighted or matched or constraints or biases (e.g., pertaining to load balancing or predicted response latency). Client data can also include specifications related to when communication channels are to be established (or closed) or when communications are to be re-routed to a different network device. Client data can be used to define various client-specific rules, such as rules for communication routing and so on.

Connection management system 350*b* executing on remote server 340 can monitor various metrics pertaining to terminal devices (e.g., pertaining to a given client), such as which communication channels are supported, geographic and/or network proximity to a network device, communication latency and/or stability with the terminal device, a type of the terminal device, a capability of the terminal device, whether the terminal device (or agent) has communicated with a given network device (or user) before and/or characteristics of associated agents (e.g., knowledge bases, experience, languages spoken, availability, general personality or sentiment, etc.). Accordingly, connection management system 350*b* may be enabled to select routings to facilitate faster responses that more accurately and/or completely respond to a network-device communication based on the metrics.

In the example depicted in FIG. 3A, a communication exchange between network device 205 and remote server 340 can facilitate early identification of a destination address. Network device 205 may then use the destination address to direct subsequent communications. For example, network device 205 may send an initial communication to remote server 340 (e.g., via one or more inter-network connections and a wide-area network), and remote server 340 may identify one or more corresponding clients. Remote server 340 may then identify a set of terminal devices associated with the one or more corresponding clients and collect metrics for those terminal devices. The metrics can be evaluated (e.g., by remote server 340) so as to select a terminal device to involve in a communication exchange, and information pertaining to the terminal device (e.g., an IP address) can be sent to network device 205. In some embodiments, remote server 340 may continuously or periodically collect and evaluate metrics for various terminal devices and store evaluation results in a data store. In such embodiments, upon identifying a set of terminal devices associated with the one or more corresponding clients, remote server 340 can access the stored evaluation results from the data store and select a terminal device to involve in the communication exchange based on the stored evaluation results.

In FIG. 3B, connection management system 350 can be configured to serve as a relay and/or destination address. Thus, for example, a set of network devices 205 may transmit communications, each identifying connection management system 350 as a destination. Connection management system 350 can receive each communication and can concurrently monitor a set of terminal devices (e.g., so as to generate metrics for each terminal device). Based on the monitoring and a rule, connection management system 350 can identify a terminal device 215 to which it may relay each communication. Depending on the embodiment, terminal device communications may similarly be directed to a consistent destination (e.g., of connection management system 350) for further relaying, or terminal devices may begin communicating directly with corresponding network devices. These embodiments can facilitate efficient routing and thorough communication monitoring.

The embodiment depicted in FIG. 3C is similar to that in FIG. 3B. However, in some embodiments, connection management system 350 is directly connected to intra-network components (e.g., terminal devices, intra-network connections, or other).

It will be appreciated that many variations of FIGS. 3A-3C are contemplated. For example, connection management system 350 may be associated with a connection component (e.g., inter-network connection component 245 or intra-network connection component 255) such that an application corresponding to connection management system 350 (or part thereof) is installed on the component. The application may, for example, perform independently or by communicating with one or more similar or complementary applications (e.g., executing on one or more other components, network devices or remotes servers).

Figure 4:
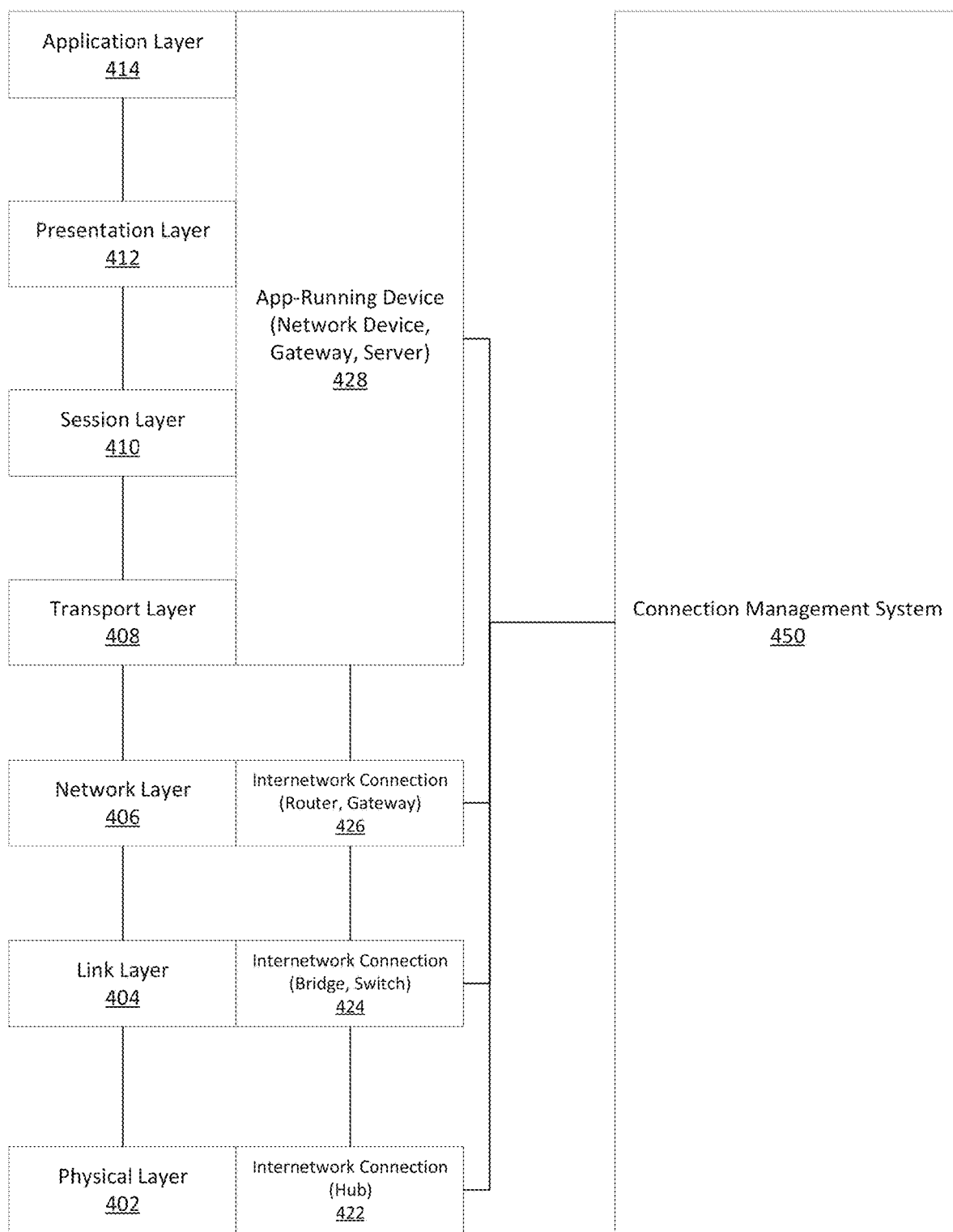
FIG. 4 shows a representation of a protocol-stack mapping of connection components' operation.

FIG. 4 shows a representation of a protocol-stack mapping 400 of connection components' operation. More specifically, FIG. 4 identifies a layer of operation in an Open Systems Interaction (OSI) model that corresponds to various connection components.

The OSI model can include multiple logical layers 402-414. The layers are arranged in an ordered stack, such that layers 402-412 each serve a higher level and layers 404-414 is each served by a lower layer. The OSI model includes a physical layer 402. Physical layer 402 can define parameters physical communication (e.g., electrical, optical, or electromagnetic). Physical layer 402 also defines connection management protocols, such as protocols to establish and close connections. Physical layer 402 can further define a flow-control protocol and a transmission mode.

A link layer 404 can manage node-to-node communications. Link layer 404 can detect and correct errors (e.g., transmission errors in the physical layer 402) and manage access permissions. Link layer 404 can include a media access control (MAC) layer and logical link control (LLC) layer.

A network layer 406 can coordinate transferring data (e.g., of variable length) across nodes in a same network (e.g., as datagrams). Network layer 406 can convert a logical network address to a physical machine address.

A transport layer 408 can manage transmission and receipt quality. Transport layer 408 can provide a protocol for transferring data, such as a Transmission Control Protocol (TCP). Transport layer 408 can perform segmentation/desegmentation of data packets for transmission and can detect and account for transmission errors occurring in layers 402-406. A session layer 410 can initiate, maintain and terminate connections between local and remote applications. Sessions may be used as part of remote-procedure interactions. A presentation layer 412 can encrypt, decrypt and format data based on data types known to be accepted by an application or network layer.

An application layer 414 can interact with software applications that control or manage communications. Via such applications, application layer 414 can (for example) identify destinations, local resource states or availability and/or communication content or formatting. Various layers 402-414 can perform other functions as available and applicable.

Intra-network connection components 422, 424 are shown to operate in physical layer 402 and link layer 404. More specifically, a hub can operate in the physical layer, such that operations can be controlled with respect to receipts and transmissions of communications. Because hubs lack the ability to address communications or filter data, they possess little to no capability to operate in higher levels. Switches, meanwhile, can operate in link layer 404, as they are capable of filtering communication frames based on addresses (e.g., MAC addresses).

Meanwhile, inter-network connection components 426, 428 are shown to operate on higher levels (e.g., layers 406-414). For example, routers can filter communication data packets based on addresses (e.g., IP addresses). Routers can forward packets to particular ports based on the address, so as to direct the packets to an appropriate network. Gateways can operate at the network layer and above, perform similar filtering and directing and further translation of data (e.g., across protocols or architectures).

A connection management system 450 can interact with and/or operate on, in various embodiments, one, more, all or any of the various layers. For example, connection management system 450 can interact with a hub so as to dynamically adjust which terminal devices the hub communicates. As another example, connection management system 450 can communicate with a bridge, switch, router or gateway so as to influence which terminal device the component selects as a destination (e.g., MAC, logical or physical) address. By way of further examples, a connection management system 450 can monitor, control, or direct segmentation of data packets on transport layer 408, session duration on session layer 410, and/or encryption and/or compression on presentation layer 412. In some embodiments, connection management system 450 can interact with various layers by exchanging communications with (e.g., sending commands to) equipment operating on a particular layer (e.g., a switch operating on link layer 404), by routing or modifying existing communications (e.g., between a network device and a terminal device) in a particular manner, and/or by generating new communications containing particular information (e.g., new destination addresses) based on the existing communication. Thus, connection management system 450 can influence communication routing and channel establishment (or maintenance or termination) via interaction with a variety of devices and/or via influencing operating at a variety of protocol-stack layers.

Figure 5:
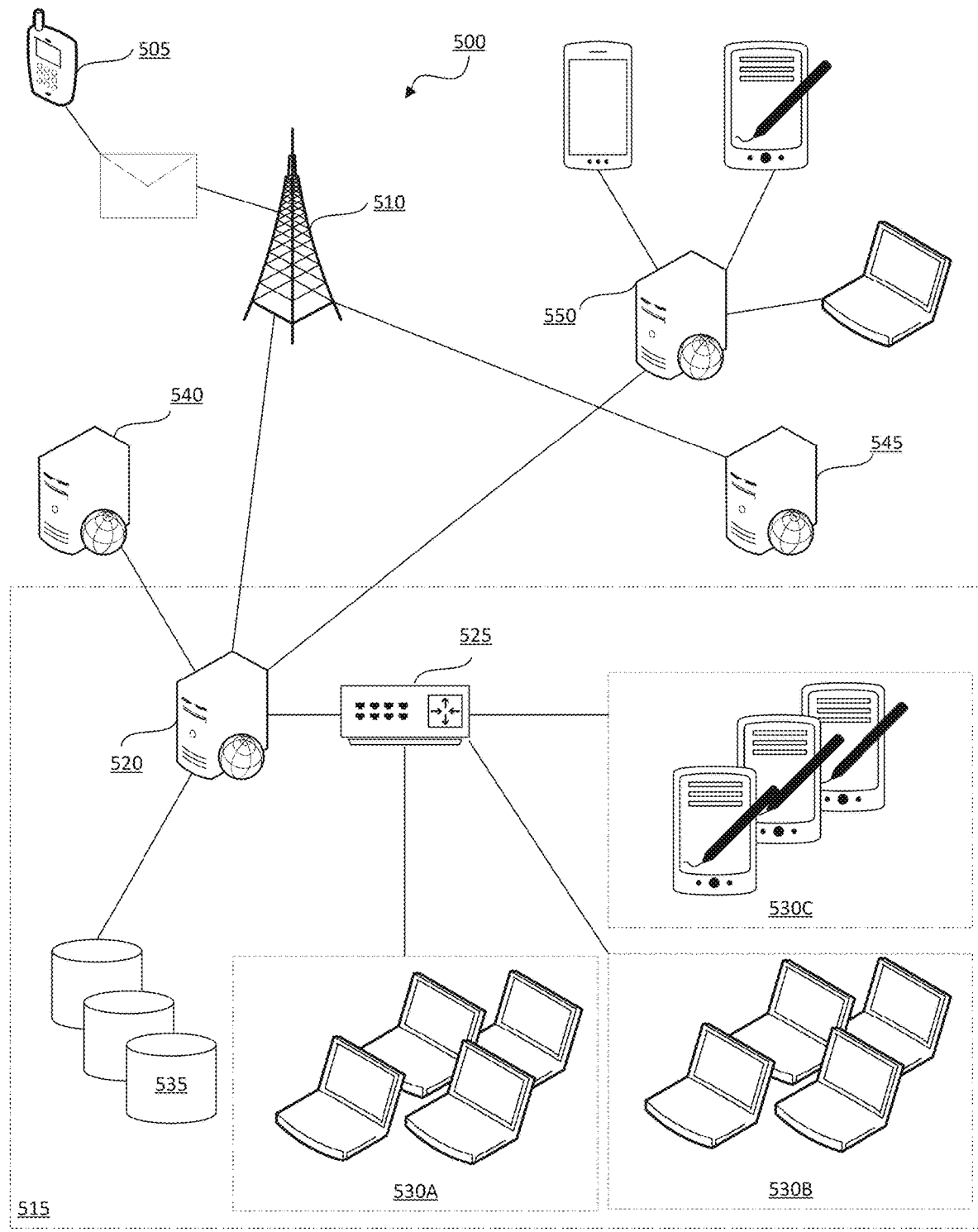
FIG. 5 represents a multi-device communication exchange system according to an embodiment.

FIG. 5 represents a multi-device communication exchange system 500 according to an embodiment. System 500 includes a network device 505 configured to communicate with a variety of types of terminal devices over a variety of types of communication channels.

In the depicted instance, network device 505 can transmit a communication over a cellular network (e.g., via a base station 510). The communication can be routed to an operative network 515. Operative network 515 can include a connection management system 520 that receives the communication and identifies which terminal device is to respond to the communication. Such determination can depend on identifying a client to which that communication pertains (e.g., based on a content analysis or user input indicative of the client) and determining one or more metrics for each of one or more terminal devices associated with the client. For example, in FIG. 5, each cluster of terminal devices 530a-c can correspond to a different client. The terminal devices may be geographically co-located or disperse. The metrics may be determined based on stored or learned data and/or real-time monitoring (e.g., based on availability).

Connection management system 520 can communicate with various terminal devices via one or more routers 525 or other inter-network or intra-network connection components. Connection management system 520 may collect, analyze and/or store data from or pertaining to communications, terminal-device operations, client rules, and/or user-associated actions (e.g., online activity) at one or more data stores. Such data may influence communication routing.

Notably, various other devices can further be used to influence communication routing and/or processing. For example, in the depicted instance, connection management system 520 also is connected to a web server 540. Thus, connection management system 520 can retrieve data of interest, such as technical item details, and so on.

Network device 505 may also be connected to a web server (e.g., including a web server 545). In some instances, communication with such a server provided an initial option to initiate a communication exchange with connection management system 520. For example, network device 505 may detect that, while visiting a particular webpage, a communication opportunity is available and such an option can be presented.

One or more elements of communication system 500 can also be connected to a social-networking server 550. Social networking server 550 can aggregate data received from a variety of user devices. Thus, for example, connection management system 520 may be able to estimate a general (or user-specific) behavior of a given user or class of users.

Figure 6:
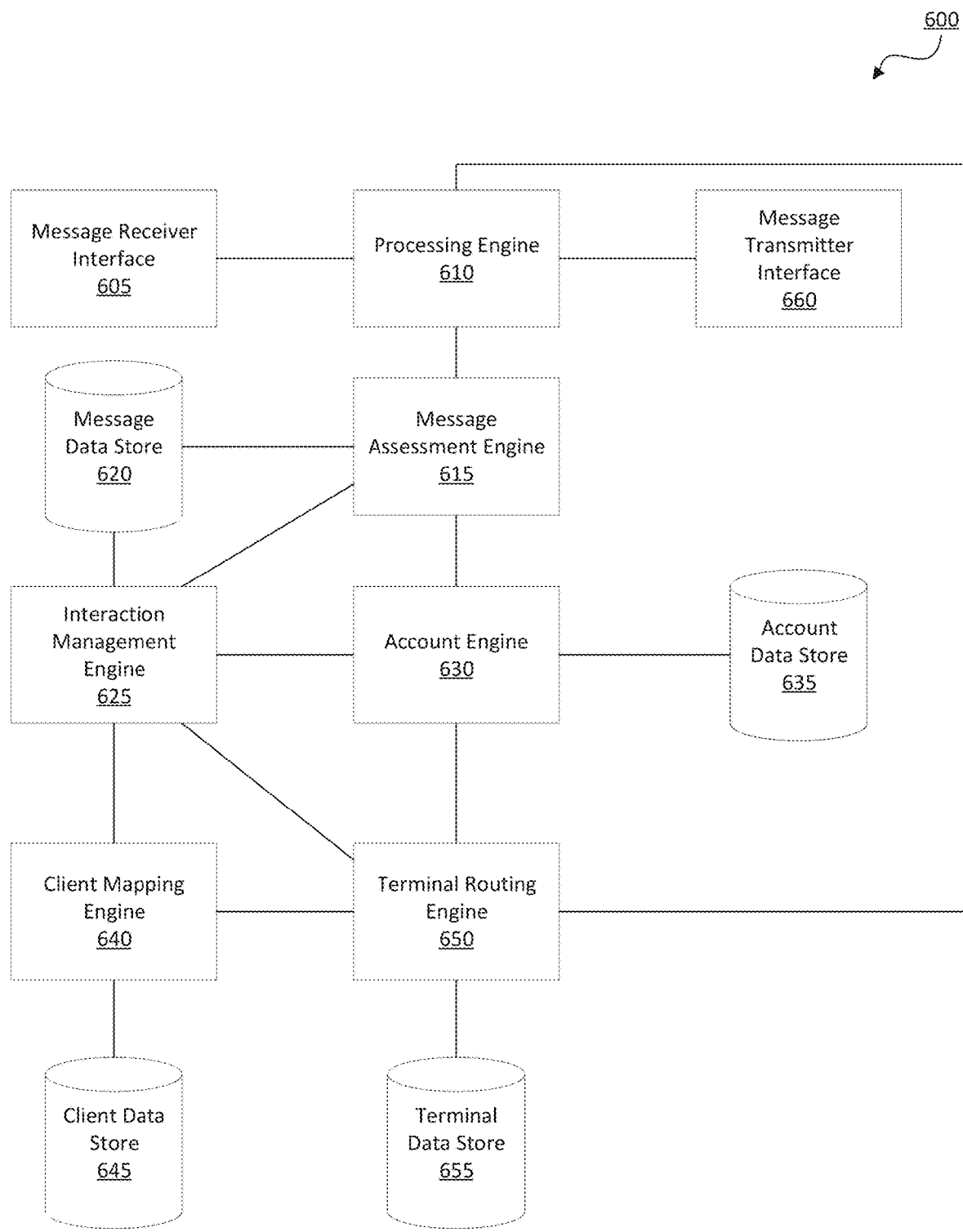
FIG. 6 shows a block diagram of an embodiment of a connection management system.

FIG. 6 shows a block diagram of an embodiment of a connection management system 600. A message receiver interface 605 can receive a message. In some instances, the message can be received, for example, as part of a communication transmitted by a source device (e.g., housed separately from connection management system 600 or within a same housing), such as a network device or terminal device. In some instances, the communication can be part of a series of communications or a communicate exchange, which can include a series of messages or message exchange being routed between two devices (e.g., a network device and terminal device). This message or communication exchange may be part of and/or may define an interaction between the devices. A communication channel or operative channel can include one or more protocols (e.g., routing protocols, task-assigning protocols and/or addressing protocols) used to facilitate routing and a communication exchange between the devices.

In some instances, the message can include a message generated based on inputs received at a local or remote user interface. For example, the message can include a message that was generated based on button or key presses or recorded speech signals. In one instance, the message includes an automatically generated message, such as one generated upon detecting that a network device is presenting a particular app page or webpage or has provided a particular input command (e.g., key sequence). The message can include an instruction or request, such as one to initiate a communication exchange.

In some instances, the message can include or be associated with an identifier of a client. For example, the message can explicitly identify the client (or a device associated with the client); the message can include or be associated with a webpage or app page associated with the client; the message can include or be associated with a destination address associated with a client; or the message can include or be associated with an identification of an item (e.g., product) or service associated with the client. To illustrate, a network device may be presenting an app page of a particular client, which may offer an option to transmit a communication to an agent. Upon receiving user input corresponding to a message, a communication may be generated to include the message and an identifier of the particular client.

A processing engine 610 may process a received communication and/or message. Processing can include, for example, extracting one or more particular data elements (e.g., a message, a client identifier, a network-device identifier, an account identifier, and so on). Processing can include transforming a formatting or communication type (e.g., to be compatible with a particular device type, operating system, communication-channel type, protocol and/or network).

A message assessment engine 615 may assess the (e.g., extracted or received) message. The assessment can include identifying, for example, one or more categories or tags for the message. Examples of category or tag types can include (for example) topic, sentiment, complexity, and urgency. A difference between categorizing and tagging a message can be that categories can be limited (e.g., according to a predefined set of category options), while tags can be open. A topic can include, for example, a technical issue, a use question, or a request. A category or tag can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency).

In some instances, message assessment engine 615 can determine a metric for a message. A metric can include, for example, a number of characters, words, capital letters, all-capital words or instances of particular characters or punctuation marks (e.g., exclamation points, question marks and/or periods). A metric can include a ratio, such as a fraction of sentences that end with an exclamation point (or question mark), a fraction of words that are all capitalized, and so on.

Message assessment engine 615 can store a message, message metric and/or message statistic in a message data store 620. Each message can also be stored in association with other data (e.g., metadata), such as data identifying a corresponding source device, destination device, network device, terminal device, client, one or more categories, one or more stages and/or message-associated statistics). Various components of connection management system 600 (e.g., message assessment engine 615 and/or an interaction management engine 625) can query message data store 620 to retrieve query-responsive messages, message metrics and/or message statistics.

An interaction management engine 625 can determine to which device a communication is to be routed and how the receiving and transmitting devices are to communicate. Each of these determinations can depend, for example, on whether a particular network device (or any network device associated with a particular user) has previously communicated with a terminal device in a set of terminal devices (e.g., any terminal device associated with connection management system 600 or any terminal device associated with one or more particular clients).

In some instances, when a network device (or other network device associated with a same user or profile) has previously communicated with a given terminal device, communication routing can be generally biased towards the same terminal device. Other factors that may influence routing can include, for example, whether the terminal device (or corresponding agent) is available and/or a predicted response latency of the terminal device. Such factors may be considered absolutely or relative to similar metrics corresponding to other terminal devices. A re-routing rule (e.g., a client-specific or general rule) can indicate how such factors are to be assessed and weighted to determine whether to forego agent consistency.

When a network device (or other network device associated with a same user or account) has not previously communicated with a given terminal device, a terminal-device selection can be performed based on factors such as, for example, an extent to which various agents' knowledge base corresponds to a communication topic, availability of various agents at a given time and/or over a channel type, types and/or capabilities of terminal devices (e.g., associated with the client). In one instance, a rule can identify how to determine a sub-parameter to one or more factors such as these and a weight to assign to each parameter. By combining (e.g., summing) weighted sub-parameters, a parameter for each agent can be determined. A terminal device selection can then be made by comparing terminal devices' parameters.

With regard to determining how devices are to communicate, interaction management engine 625 can (for example) determine whether a terminal device is to respond to a communication via (for example) SMS message, voice call, video communication, etc. A communication type can be selected based on, for example, a communication-type priority list (e.g., at least partly defined by a client or user); a type of a communication previously received from the network device (e.g., so as to promote consistency), a complexity of a received message, capabilities of the network device, and/or an availability of one or more terminal devices. Appreciably, some communication types will result in real-time communication (e.g., where fast message response is expected), while others can result in asynchronous communication (e.g., where delays (e.g., of several minutes or hours) between messages are acceptable).

Further, interaction management engine 625 can determine whether a continuous channel between two devices should be established, used or terminated. A continuous channel can be structured so as to facilitate routing of future communications from a network device to a specified terminal device. This bias can persist even across message series. In some instances, a representation of a continuous channel (e.g., identifying an agent) can be included in a presentation to be presented on a network device. In this manner, a user can understand that communications are to be consistently routed so as to promote efficiency.

In one instance, a parameter can be generated using one or more factors described herein and a rule (e.g., that includes a weight for each of the one or more factors) to determine a connection parameter corresponding to a given network device and terminal device. The parameter may pertain to an overall match or one specific to a given communication or communication series. Thus, for example, the parameter may reflect a degree to which a given terminal device is predicted to be suited to respond to a network-device communication. In some instances, a parameter analysis can be used to identify each of a terminal device to route a given communication to and whether to establish, use or terminate a connection channel. When a parameter analysis is used to both address a routing decision and a channel decision, a parameter relevant to each decision may be determined in a same, similar or different manner.

Thus, for example, it will be appreciated that different factors may be considered depending on whether the parameter is to predict a strength of a long-term match versus one to respond to a particular message query. For example, in the former instance, considerations of overall schedules and time zones may be important, while in the latter instance, immediate availability may be more highly weighted. A parameter can be determined for a single network-device/terminal-device combination, or multiple parameters can be determined, each characterizing a match between a given network device and a different terminal device.

To illustrate, a set of three terminal devices associated with a client may be evaluated for potential communication routing. A parameter may be generated for each that relates to a match for the particular communication. Each of the first two terminal devices may have previously communicated with a network device having transmitted the communication. An input from the network device may have indicated positive feedback associated with an interaction with the communication(s) with the first device. Thus, a past-interact sub-parameter (as calculated according to a rule) for the first, second and third devices may be 10, 5, and 0, respectively. (Negative feedback inputs may result in negative sub-parameters.) It may be determined that only the third terminal device is available. It may be predicted that the second terminal device will be available for responding within 15 minutes, but that the first terminal device will not be available for responding until the next day. Thus, a fast-response sub-parameter for the first, second and third devices may be 1, 3 and 10. Finally, it may be estimated a degree to which an agent (associated with the terminal device) is knowledgeable about a topic in the communication. It may be determined that an agent associated with the third terminal device is more knowledgeable than those associated with the other two devices, resulting in sub-parameters of 3, 4 and 9. In this example, the rule does not include weighting or normalization parameters (though, in other instances, a rule may), resulting in parameters of 14, 11 and 19. Thus, the rule may indicate that the message is to be routed to a device with the highest parameter, that being the third terminal device. If routing to a particular terminal device is unsuccessful, the message can be routed to a device with the next-highest parameter, and so on.

A parameter may be compared to one or more absolute or relative thresholds. For example, parameters for a set of terminal devices can be compared to each other to identify a high parameter to select a terminal device to which a communication can be routed. As another example, a parameter (e.g., a high parameter) can be compared to one or more absolute thresholds to determine whether to establish a continuous channel with a terminal device. An overall threshold for establishing a continuous channel may (but need not) be higher than a threshold for consistently routing communications in a given series of messages. This difference between the overall threshold and threshold for determining whether to consistently route communication may be because a strong match is important in the continuous-channel context given the extended utility of the channel. In some embodiments, an overall threshold for using a continuous channel may (but need not) be lower than a threshold for establishing a continuous channel and/or for consistently routing communications in a given series of messages.

Interaction management engine 625 can interact with an account engine 630 in various contexts. For example, account engine 630 may look up an identifier of a network device or terminal device in an account data store 635 to identify an account corresponding to the device. Further, account engine 630 can maintain data about previous communication exchanges (e.g., times, involved other device(s), channel type, resolution stage, topic(s) and/or associated client identifier), connection channels (e.g., indicating—for each of one or more clients—whether any channels exist, a terminal device associated with each channel, an establishment time, a usage frequency, a date of last use, any channel constraints and/or supported types of communication), user or agent preferences or constraints (e.g., related to terminal-device selection, response latency, terminal-device consistency, agent expertise, and/or communication-type preference or constraint), and/or user or agent characteristics (e.g., age, language(s) spoken or preferred, geographical location, interests, and so on).

Further, interaction management engine 625 can alert account engine 630 of various connection-channel actions, such that account data store 635 can be updated to reflect the current channel data. For example, upon establishing a channel, interaction management engine 625 can notify account engine 630 of the establishment and identify one or more of: a network device, a terminal device, an account and a client. Account engine 635 can (in some instances) subsequently notify a user of the channel's existence such that the user can be aware of the agent consistency being availed.

Interaction management engine 625 can further interact with a client mapping engine 640, which can map a communication to one or more clients (and/or associated brands). In some instances, a communication received from a network device itself includes an identifier corresponding to a client (e.g., an identifier of a client, webpage, or app page). The identifier can be included as part of a message (e.g., which client mapping engine 640 may detect) or included as other data in a message-inclusive communication. Client mapping engine 640 may then look up the identifier in a client data store 645 to retrieve additional data about the client and/or an identifier of the client.

In some instances, a message may not particularly correspond to any client. For example, a message may include a general query. Client mapping engine 640 may, for example, perform a semantic analysis on the message, identify one or more keywords and identify one or more clients associated with the keyword(s). In some instances, a single client is identified. In some instances, multiple clients are identified. An identification of each client may then be presented via a network device such that a user can select a client to communicate with (e.g., via an associated terminal device).

Client data store 645 can include identifications of one or more terminal devices (and/or agents) associated with the client. A terminal routing engine 650 can retrieve or collect data pertaining to each of one, more or all such terminal devices (and/or agents) so as to influence routing determinations. For example, terminal routing engine 650 may maintain a terminal data store 655, which can store information such as terminal devices' device types, operating system, communication-type capabilities, installed applications accessories, geographic location and/or identifiers (e.g., IP addresses). Some information can be dynamically updated. For example, information indicating whether a terminal device is available may be dynamically updated based on (for example) a communication from a terminal device (e.g., identifying whether the device is asleep, being turned off/on, non-active/active, or identifying whether input has been received within a time period); a communication routing (e.g., indicative of whether a terminal device is involved in or being assigned to be part of a communication exchange); or a communication from a network device or terminal device indicating that a communication exchange has ended or begun.

It will be appreciated that, in various contexts, being engaged in one or more communication exchanges does not necessarily indicate that a terminal device is not available to engage in another communication exchange. Various factors, such as communication types (e.g., message), client-identified or user-identified target response times, and/or system loads (e.g., generally or with respect to a user) may influence how many exchanges a terminal device may be involved in.

When interaction management engine 625 has identified a terminal device to involve in a communication exchange or connection channel, it can notify terminal routing engine 650, which may retrieve any pertinent data about the terminal device from terminal data store 655, such as a destination (e.g., IP) address, device type, protocol, etc. Processing engine 610 can then (in some instances) modify the message-inclusive communication or generate a new communication (including the message) so as to have a particular format, comply with a particular protocol, and so on. In some instances, a new or modified message may include additional data, such as account data corresponding to a network device, a message chronicle, and/or client data.

A message transmitter interface 660 can then transmit the communication to the terminal device. The transmission may include, for example, a wired or wireless transmission to a device housed in a separate housing. The terminal device can include a terminal device in a same or different network (e.g., local-area network) as connection management system 600. Accordingly, transmitting the communication to the terminal device can include transmitting the communication to an inter- or intra-network connection component.

Systems and methods for transferring messaging to automation via a bot during communication sessions with network devices (e.g., operated by users) are provided. A user may use a network device to initiate a conversation with an agent regarding resolution of an issue. The agent may launch a widget on the associated terminal device to accelerate resolution of the user's intent. The user's intent may be automatically identified and a recommended automation to transfer to a bot may be made. Key user information may also be provided, such as order number, account number, and the like. The agent may manually or automatically initiate a transfer to a bot, which allows the agent to provide feedback on the recommendation to transfer. In addition, the agent may use the terminal device to watch the transferred conversation and rescue the conversation if the user begins to appear dissatisfied. The conversation between the user and the bot may appear inline to the conversation with the agent.

In some embodiments, an agent is able to monitor multiple conversations that were transferred to a bot and rescue the conversation if needed. A sentiment score may be utilized to displayed on the terminal device to facilitate priority of rescuing conversations. Assist features utilizing artificial intelligence such as "intent hint" and "recommended automation" may be shown as actionable inline suggestions within the conversation window. The feedback may be used and analyzed in aggregate to apply data science as training input to models.

In some implementations, bots can be configured to autonomously communicate with network devices. Further, bots can be configured for a specific capability. Examples of capabilities can include updating database records, providing updates to users, providing additional data about the user to agents, determining a user's intent and routing the user to a destination system based on the intent, predicting or suggesting responses to agents communicating with users, escalating communication sessions to include one or more additional bots or agents, and other suitable capabilities. In some implementations, while a bot is communicating with a network device (e.g., operated by the user) during a communication session (e.g., using a chat-enabled interface), a communication server can automatically and dynamically determine to switch the bot with a terminal device. For example, bots can communicate with users about certain tasks (e.g., updating a database record associated with a user), whereas, terminal devices can communicate with users about more difficult tasks (e.g., communicating using a communication channel to solve a technical issue).

In some implementations, determining whether to switch to automation during a communication session can be based on an analysis of one or more characteristics of the messages in a communication session. Further, a dynamic sentiment parameter can be generated to represent a sentiment of messages, conversations, entities, agents, and so on. For example, in cases where the dynamic sentiment parameter indicates that the user is frustrated with the bot, the system can automatically switch the bot with a terminal device so that a live agent can communicate with the user. See U.S. Ser. No. 15/171,525, filed Jun. 2, 2016, the disclosure of which is incorporated by reference herein in its entirety for all purposes. In some examples, determining whether to switch between the bots and terminal devices can be performed without a prompt from a user. The determination can be performed automatically at the communication server based any number of factors, including characteristics of the current messages in the communication session (e.g., chat), characteristics of previous messages transmitted by the user in previous communication sessions, a trajectory of a characteristic (e.g., a sentiment) over multiple messages in a conversation, or additional information associated with the user (e.g., profile information, preference information, and other suitable information associated with the user).

Figure 7:
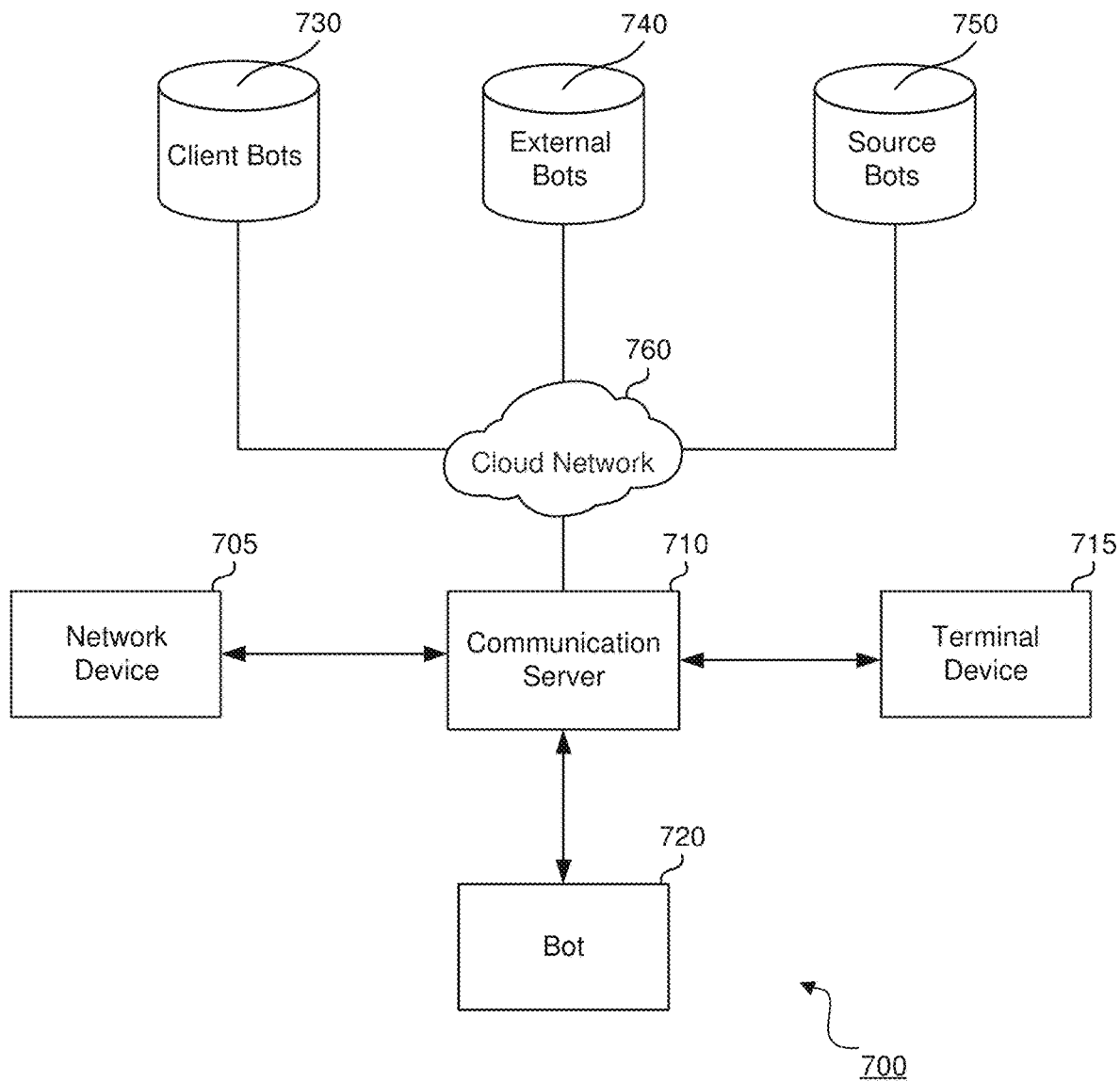
FIG. 7 shows a block diagram of a network environment for dynamically switching between bots and terminal devices during communication sessions.

FIG. 7 shows a block diagram of a network environment for dynamically switching between bots and terminal devices during communication sessions. In some implementations, network environment 700 can include network device 705, communication server 710, terminal device 715, and bot 720. Communication server 710 can be a server with one or more processors with at least one storage device, and can be configured to perform methods and techniques described herein. For example, communication server 710 can manage communication sessions between network devices (e.g., operated by users) and terminal devices (e.g., operated by agents). Communication server 710 can establish a communication channel between network device 705 and terminal device 715 so that network device 705 and terminal device 715 can communicate with each other during a communication session. A communication session can facilitate the exchange of one or more messages between network device 705 and terminal device 715. The present disclosure is not limited to the exchange of messages during a communication session. Other forms of communication can be facilitated by the communication session, for example, video communication (e.g., a video feed) and audio communication (e.g., a Voice-Over-IP connection).

In some implementations, communication server 710 can establish a communication channel between network device 705 and bot 720. Bot 720 can be code that, when executed, is configured to autonomously communicate with network device 705. For example, bot 720 can be a bot that automatically generates messages to initiate conversations with the user associated with network device 705 and/or to automatically respond to messages from network device 705. In addition, communication server 710 can be associated with a platform. Clients (e.g., an external system to the platform) can deploy different types of bots in their internal communication systems using the platform. In some examples, clients can use their own bots in the platform, which enables clients to implement the methods and techniques described herein into their internal communication systems.

In some implementations, bots can be defined by one or more sources. For example, data store 730 can store code representing bots that are defined (e.g., created or coded) by clients of the communication server. For example, a client that has defined its own bots can load the bots to the communication server 710. The bots defined by clients can be stored in client bots data store 730. Data store 740 can store code representing bots that are defined by third-party systems. For example, a third-party system can include an independent software vendor. Data store 750 can store code representing bots that are defined by an entity associated with communication server 710. For example, bots that are coded by the entity can be loaded to or accessible by communication server 710, so that the bots can be executed and autonomously communicate with users. In some implementations, communication server 710 can access bots stored in data store 730, data store 740, and/or data store 750 using cloud network 760. Cloud network 760 may be any network, and can include an open network, such as the Internet, personal area network, local area network (LAN), campus area network (CAN), metropolitan area network (MAN), wide area network (WAN), wireless local area network (WLAN), a private network, such as an intranet, extranet, or other backbone.

In addition, terminal device 715 can be operated by an agent. Terminal device 715 can be any portable (e.g., mobile phone, tablet, laptop) or non-portable device (e.g., electronic kiosk, desktop computer, etc.). In some instances, the agent can access a website using a browser that is running on terminal device 715. For example, the website can include a console or platform that is running on the browser of terminal device 715. The agent can be logged into the platform using the browser. One or more login credentials (e.g., username, password, and the like) can be used to authenticate the agent's identity before allowing the agent to gain access to the console or web applications included in the console. Examples of a console can include a platform that includes one or more APIs (application programming interfaces), a dashboard including one or more functions, a web-hosted application running on a web browser (without the need for downloading plug-ins) that is capable of establishing or joining a communication session, and other suitable interfaces. Further, the console can include one or more web applications or functions that can be executed. The web applications or functions can be executed at the browser, at communication server 710, a local server, a remote server, or other suitable computing device. For example, the web applications, native applications, or functions can enable an agent to communicate with a user, and to view communications between the user and one or more bots.

In some implementations, communication server 710 can recommend automations that cause a conversation to dynamically switch between bot 720 and terminal device 715 during a particular communication session. For example, communication server 710 can facilitate a communication session between network device 705 and bot 720. Bot 720 can be configured to autonomously communicate with network device 705 by exchanging one or more messages with the network device 705 during the communication session. Communication server 710 can dynamically determine whether to switch bot 720 with terminal device 715 (or in some cases, vice versa) so that a live agent can communicate with network device 705, instead of bot

720. In some implementations, the switching can be performed without a prompt from the network device 705 or terminal device 715. For example, the switching can be based on message parameters (e.g., scores representing sentiment of a message or series of messages) of the messages exchanged between the network device 705 and the bot 720, without prompting the network device 705 to request a terminal device.

In some implementations, the communication server 710 utilizes one or more machine learning models or artificial intelligence to automatically determine whether to switch bot 720 with terminal device 715 (or in some cases, vice versa). For instance, messages exchanged between the network device 705 and the bot 720 may be used as input by the one or more machine learning models or artificial intelligence to generate an output. The output may specify whether the communication session between the network device 705 and the bot 720 is to be switched to a live agent or is to be maintained. The machine learning models may be trained using supervised learning techniques. For instance, a dataset of input messages and corresponding outputs specifying the appropriate responding entity (e.g., live agent or bot) can be selected for training of the machine learning models. In some examples, the input messages can be obtained from administrators of the communication server 710, users of the network device 705 and other network devices that may interact with the communication server 710, and/or other sources associated with the communication server 710. The machine learning models or artificial intelligence may be evaluated to determine, based on the input messages supplied to the machine learning models or artificial intelligence, whether the machine learning models or artificial intelligence are providing useful outputs that can be used to determine whether the corresponding communication sessions are to be processed by a live agent or a bot. Based on this evaluation, the machine learning models or artificial intelligence may be modified (e.g., one or more parameters or variables may be updated) to increase the likelihood of the machine learning models or artificial intelligence generating the desired results.

In some implementations, the one or more machine learning models or artificial intelligence may generate, as output, the scores representing sentiment of an input message or series of messages. The communication server 710 may determine whether the resulting score exceeds a threshold value corresponding to allocation of a communication session to a bot 720 or live agent. For instance, if the score exceeds the threshold value, the communication server 710 may determine that the communication session is best suited for a bot 720. Thus, if the communication session is currently between a network device 705 and a terminal device 715 (e.g., live agent), the communication server 710 may automatically transition the communication session from the terminal device 715 to a bot 720 or indicate, to the live agent operating the terminal device 715, that the bot 720 may handle the communication session with the network device 705. Alternatively, if the score does not exceed this threshold value, the communication server 710 may determine that the communication session is best suited for a terminal device 715 (e.g., live agent). In this example, if the communication session is currently between a network device 705 and a bot 720, the communication server 710 may automatically transition the communication session from the bot 720 to a terminal device 715. In some instances, if the score does not exceed this threshold value, the communication server 710 may indicate, to the live agent operating the terminal device 715, that it should intervene in the communication session.

It should be noted that the threshold and scores described above are meant to be illustrative and alternative thresholds and scoring mechanisms may be implemented to determine whether to utilize a bot 720 or terminal device 715 for a particular communication session with a network device 705.

In some instances, the communication server 710 may implement a dynamic set of rules or policies that may be used to determine a relevant action for a given communication session with the network device 705. The set of rules may be provided by an administrator or other authorized entity associated with the communication server 710 or may be generated using one or more machine learning algorithms or artificial intelligence as described above. As an illustrative example, the communication server 710 may evaluate the conversational progress between the network device 705 and either the bot 720 or terminal device 715 to determine, based on the set of rules or policies, whether to invoke alternative actions (e.g., such as transitioning the communication session from the bot 720 to the terminal device 715 or vice versa). For example, if the communication server 710 determines, based on obtained messages exchanged during the communication session, that there is a flux in the confidence score for the bot 720 and/or in the sentiment score for the user of the network device 705, the communication server 710 may determine, based on the set of rules or policies relevant to the communication session, an appropriate action. This may include transitioning the communication session from a bot 720 to a terminal device 715, transmitting a notification to the terminal device 715 indicating that it is to intervene in the communication session, and the like. Once the relevant action is taken, the communication server 710 may continue to monitor subsequent messages exchanged during the communication session to evaluate the impact of the action taken subject to the set of rules or policies. Based on feedback garnered from these subsequent messages and/or from the user and live agent post-session, the communication server 710 may update the machine learning algorithms or artificial intelligence utilized to generate the set of rules or policies. These updates may result in the dynamic creation or modification of the set of rules or policies to provide improved recommendations for actions to be taken during a communication session. If the set of rules or policies are defined by an administrator or other authorized entity associated with the communication server 710, the communication server 710 may provide the obtained feedback and a set of recommendations for updating the set of rules or policies to the administrator or other authorized entity.

In some implementations, communication server 710 can determine to switch between bot 720 and terminal device 715 automatically based on characteristics of the messages exchanged between the bot 720 and the network device 705. In some instances, analyzing the text of a message to determine the characteristic (e.g., the message parameter) can include an analysis of textual or non-textual attributes associated with the message. For example, communication server 710 can extract one or more lines of text included in the message from network device 705. Communication server 710 can identify whether the one or more lines of text include an anchor. Examples of an anchor include a string of text associated with a polarity (e.g., sentiment or intent, the word "frustrated" corresponding to a negative polarity or frustrated polarity, the word "happy" corresponding to a positive polarity, and so on). For example, a term "dispute" for one client can be negative, but can be neutral or positive for a second client. In some instances, anchors can be dynamically determined using supervised machine learning techniques. For example, one or more clustering algorithms can be executed on stored messages to find patterns within the stored messages. The clustered messages can be further filtered and evaluated to determine the anchor. Further, one or more words near the identified anchor can be parsed for amplifiers. An example of an amplifier is a term that increases or decreases an intensity associated with the polarity of the anchor, such as "really," "not really," "kind of," and so on. The characteristic can include, for example, the speed of typing, the number of special characters used in the message (e.g., exclamation points, question marks, and so on), a semantic analysis of a message (e.g., by identifying keywords, sentence structures, repeated words, punctuation characters and/or non-article words); user input (e.g., having selected one or more categories); and/or message-associated statistics (e.g., response latency).

As a non-limiting example, the message parameter can be a numerical value that indicates the high intensity of the negative polarity (e.g., a message parameter of 20 on a scale of 0-100, with lower numbers indicating a negative polarity and higher numbers indicating a positive polarity). An algorithm can be used to calculate the message parameter. For example, the algorithm may be based on supervised machine learning techniques. In a further example, if the term "kind of" is near the anchor "don't like" (e.g., as in the sentence "I kind of don't like"), the term "kind of" may be identified as an amplifier term that indicates a medium intensity of the negative polarity. In this case, a message parameter can be generated based on the identification of the medium intensity of the negative polarity. As a non-limiting example, the message parameter can be a numerical value that indicates the medium intensity of the negative polarity (e.g., a message parameter of 40, as opposed to the message parameter of 20). In some instances, the message parameter can be used to determine which secondary queue is to store the communication.

In some implementations, the characteristic of a message can be the sentiment associated with the message. The message parameter can represent the sentiment of the message. For example, if the sentiment of the message is happy, the message parameter can be a certain value or range of values, whereas, if the sentiment of the message is angry, the message parameter can be another value or range of values. Determining whether to switch between the bots and the terminal device can be based on the message parameter, which is continuously and automatically updated with each new message received at communication server 710.

In some implementations, if the communication server 710 determines that a conversation is to be switched from a bot 720 to a terminal device (e.g., live agent), the communication server 710 identifies which terminal device (e.g., agent) is more likely to positively resolve the technical issue presented by the user of the network device 705. For instance, based on the characteristics of the messages received from the network device 705 and the technical issue expressed by the user of the network device 705 via its messages, the communication server 710 may identify a terminal device associated with an agent that is likely to address the technical issue while providing a higher likelihood of a positive interaction with the user.

To identify which agent is best suited for responding to a user for a technical issue, the communication server 710 may use the characteristics of the messages received from the network device 705 and the technical issue expressed by the user of the network device 705 as input to a machine learning model or artificial intelligence algorithm configured to provide, as output, selection of a particular agent. The machine learning model or artificial intelligence algorithm may be trained using feedback associated with previously conducted conversations between users and live agents. This feedback may be used to identify certain characteristics for each agent. These characteristics may include, but are not limited to, areas of expertise associated with technical issues, responsiveness to particular sentiments (e.g., ability to reduce user frustration or anger, etc.), response latency, user satisfaction rating or score, and the like. If an agent is required to intervene in a conversation between a network device 705 and a bot 720, the communication server 710 may use the machine learning model or artificial intelligence algorithm to select a particular agent that may intervene in the conversation and provide an increased likelihood of a positive user experience.

In some implementations, the communication server 710 uses feedback from the network device 705 to train or update the machine learning model or artificial intelligence algorithm used to select an agent for intervention in a conversation between a network device and a bot. For instance, if the network device 705 provides feedback indicating a negative experience with the selected agent, the communication server 710 may update the machine learning model or artificial intelligence algorithm to reduce the likelihood of the agent's selection for a conversation having identical or similar characteristics to the conversation associated with the received feedback. Alternatively, if the network device 705 provides feedback indicating a positive experience with the selected agent, the communication server 710 may update the machine learning model or artificial intelligence algorithm to further reinforce the agent's ability to positively address identical or similar conversations.

In some implementations, communication server 710 may recommend or predict responses to messages received from network device 705. For example, communication server 710 can include a message recommendation system, which can evaluate messages received from network device 705 and use a machine-learning model to recommend responses to those received messages. The message recommendation system can display a set of recommended messages on terminal device 715 to assist the agent in communicating with network device 705.

Figure 8:
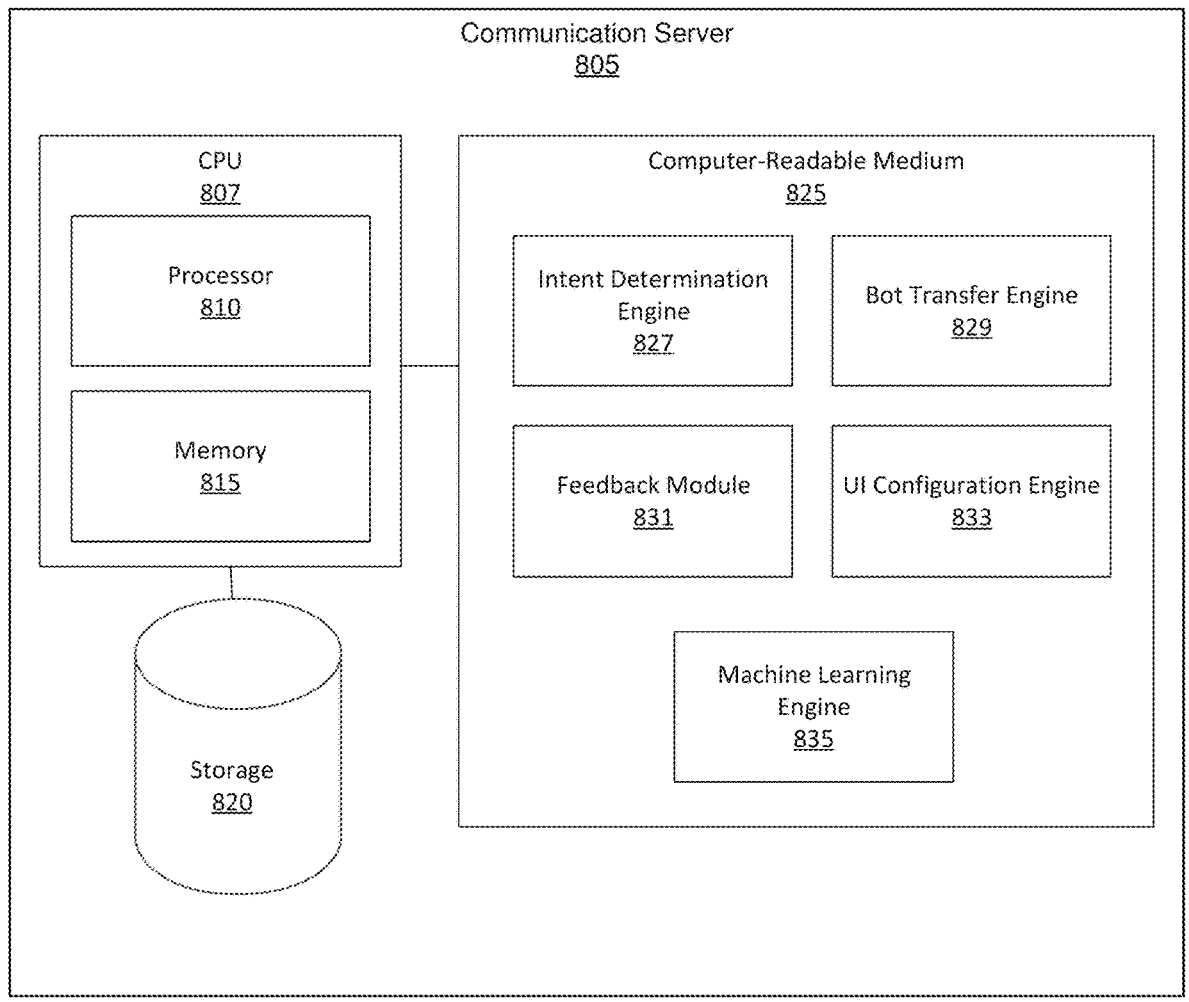
FIG. 8 shows a block diagram representing a communication server.

FIG. 8 shows a block diagram of a communication server 805 according to some embodiments. The communication server 805 may illustrate the internal components of the communication server 710 of FIG. 7. The communication server 805 may include a central processing unit (CPU) 807, including a processor 810 and memory 815. The communication server 805 may further include storage 820.

The CPU 807 may be coupled to a computer-readable medium 825. The computer-readable medium 805 may have any number of modules and engines. Although five modules and engines are illustrated, it is contemplated that fewer or greater modules or engines may be implemented in the computer-readable medium 825 to perform the functions described herein. As shown in FIG. 8, the computer-readable medium 825 may include an intent determination engine 827, a bot transfer engine 829, a feedback module 831, a user interface (UI) configuration engine 833, and a machine learning engine 835.

The intent determination engine 827 may be configured to, in conjunction with the processor 810, receive a request for a conversation. The request may be received from a network device operated by a user. The request may be received at a terminal device operated by an agent, for example. The intent determination engine 827 may further be configured to, in conjunction with the processor 810, determine an intent for the conversation. The intent may be determined from the request. For example, the request may state, "I want my order status." The intent may be extracted from the request as "order_status".

The bot transfer engine 829 may be configured to, in conjunction with the processor 810, automatically provide one or more options to transfer the conversation to a type of bot from a set of different types of bots. For instance, an option to transfer the conversation to a type of bot may be based on the intent. When this option is selected, the conversation with a bot of the corresponding type may be facilitated. The conversation may be transferred from the terminal device operated by the agent to the bot, either manually or automatically. Automatic transfer may occur, for example, for an intent with a high confidence of resolution by the particular type of bot, as determined from machine learning techniques or past experiences. In some implementations, if the bot transfer engine 829 determines, with high confidence, that an intent may be resolved by a particular type of bot, the bot transfer engine 824 may automatically transfer the conversation from the terminal device operated by the agent to a bot of the particular type without providing options to transfer the conversation to a bot of the particular type. This may obviate the need for manual selection of an option to facilitate the conversation with the bot. In some implementations, the bot transfer agent 829 may utilize a confidence threshold to determine whether to present the aforementioned one or more options to transfer the conversation to a type of bot. For example, if the bot transfer engine 829 determines that a particular intent has a high confidence score for resolution by a type of bot, and the high confidence score exceeds the confidence threshold, the bot transfer engine 829 may automatically transfer the conversation to a bot of this particular type without presenting an option to transfer the conversation to the bot. Alternatively, if the bot transfer engine 829 determines that a particular intent has a confidence score for resolution by a type of bot that does not exceed the confidence threshold, the bot transfer engine 829 may present the one or more options to transfer the conversation to the bot.

In some instances, the bot transfer engine 829 may identify one or more types of bots based on the intent determined from the request for a conversation. For example, the bot transfer engine 829, in conjunction with an intelligent routing system, may implement a confidence score algorithm that is used to calculate a confidence score corresponding to the likelihood or probability of the different types of bots producing a satisfactory response to a given intent. A confidence score may be a percentage or other value where the lower the percentage or value, the less likely the response is a good prediction for an incoming message, and the higher the percentage, the more likely the response is a good prediction for an incoming message. If the user has expressed dissatisfaction with regard to the conversation with a particular type of bot, the intelligent routing system may update the confidence score algorithm such that, for identical or similar intents, the particular type of bot is assigned a lower confidence score, thereby serving as an indication that the identical or similar intents are more likely to be handled properly by a terminal device (e.g., live agent) or another type of bot. As another non-limiting example, if the user has expressed satisfaction with regard to the conversation with a particular type of bot, the intelligent routing system may update the confidence score algorithm such that, for identical or similar intents, the particular type of bot is assigned an equal or greater confidence score, thereby serving as an indication that the identical or similar intents are more likely to be handled properly by the particular type of bot.

In some implementations, the bot transfer engine 829 may dynamically provide one or more options to transfer the conversation to a type of bot from a terminal device operated by an agent. For instance, via an interface that may be displayed on a terminal device to recommend bots and receive feedback, the bot transfer engine 829 may provide an agent with one or more recommendations for types of bots that may be able to handle the identified intent. Each recommendation may include a corresponding confidence score, which indicates a likelihood that the intent is resolvable using the corresponding type of bot. In addition to providing a confidence score for each type of bot that may be capable of handling the request, the bot transfer engine 829, via the interface, may provide an agent with an option to transfer a communication session or conversation to the type of bot. If the agent selects an option to transfer the communication session to a particular type of bot, the bot transfer engine 829 may transfer the communication session to a bot of this particular type. The bot transfer engine 829 may select the bot of the particular type based on one or more factors. For instance, the bot transfer engine 829 may select a bot of the particular type that has sufficient bandwidth to partake in the communication session with the user that submitted the request. The bot transfer engine 829 may additionally, or alternatively, select a bot of the particular type based on one or more characteristics of the user. For instance, the bot transfer engine 829 may select a bot of the particular type that is configured to communicate in a language of the user.

In some implementations, the bot transfer engine 829 may further provide an agent with an option to provide feedback with regard to each recommendation for transferring a conversation to a type of bot. For instance, if an agent determines that a particular recommendation to transfer the conversation to a particular type of bot is improper (e.g., the type of bot is not capable of handling the identified intent, the incorrect intent was identified, etc.), the bot transfer engine 824 may use this feedback to train or otherwise update the machine learning algorithms or artificial intelligence utilized to calculate confidence scores and generate recommendations based on the confidence scores for the different types of bots for a given intent and/or similar intents. This may result in a lower confidence score being assigned to the type of bot by the machine learning algorithms or artificial intelligence for an identical or similar intent. Alternatively, if the agent selects a particular type of bot to which a communication session is to be transferred, the bot transfer engine 829 may use this selection as an indication of positive feedback with regard to its recommendation to utilize the particular type of bot. This feedback may be used to train or otherwise update the machine learning algorithms or artificial intelligence described above to further validate the confidence score and recommendations for use of the particular type of bot for identical or similar intents.

In some implementations, if the agent rejects a particular recommendation to transfer the conversation to a particular type of bot, the bot transfer engine 829 may use the machine learning algorithms or artificial intelligence to generate one or more new recommendations for transferring the conversation to other types of bots based on the identified intent. As noted above, if an agent rejects a particular recommendation to transfer the conversation to a particular type of bot, the bot transfer engine 829 may use this feedback to train or otherwise update the machine learning algorithms or artificial intelligence utilized to calculate confidence scores and generate recommendations based on the confidence scores for the different types of bots for a given intent and/or similar intents. The bot transfer engine 829 may use the updated machine learning algorithms or artificial intelligence to provide new recommendations to the agent for the identified intent. Thus, the bot transfer engine 829 may dynamically and continuously provide an agent with recommendations for transferring a conversation to different types of bots based on the intent and the confidence scores for these different types of bots as calculated using the machine learning algorithms or artificial intelligence.

Different types of bots may be capable of handling certain intents in an automated fashion. For example, for the intent "order_status", an order status bot may be capable of pulling order information using a provided order number, customer name, customer e-mail address, IP address, and/or the like. Once the order information is determined, an order status may be ascertained by the order status bot and provided back to the user in the conversation. As another example, for the intent "payment_status", a payment status bot may be capable of pulling billing information using a provided account number, customer name, customer e-mail address, IP address, and/or the like. Further, using the billing information, a payment status bot may determine whether the customer has submitted a payment, whether a submitted payment has been processed, and the like. Other types of bots may be capable of handling more complex technical issues (e.g., troubleshooting hardware or software issues, addressing fraud reports, etc.).

In some embodiments, the conversation between the network device and a bot may be displayed at the terminal device to allow an agent operating the terminal device to intervene in the conversation. The agent may decide to intervene in the conversation (or the conversation may be automatically transferred back to the terminal device) based on a calculated sentiment score of the user's satisfaction with the conversation. For example, a threshold may exist for which the sentiment score should be above if the user is satisfied with the conversation. If the sentiment score is below a threshold, the conversation may be manually or automatically transferred back to the terminal device.

The sentiment score may be calculated by the machine learning engine 835, which may be configured to utilize messages exchanged during the conversation as input to generate the sentiment score. The machine learning engine 835 may utilize one or more machine learning models that are trained using supervised learning techniques. For instance, a dataset of input messages and corresponding sentiments and sentiment scores can be selected for training of the machine learning models. In some examples, the input messages can be obtained from administrators of the communication server 805, users, agents, and other sources. The one or more machine learning models may be evaluated to determine, based on the input messages supplied to the one or more machine learning models, whether the one or more machine learning models are providing useful outputs that can be used to determine the sentiment and corresponding sentiment score for a conversation. Based on this evaluation, the one or more machine learning may be modified (e.g., one or more parameters or variables may be updated) to increase the likelihood of the one or more machine learning models generating the desired results.

In some instances, the one or more machine learning models may utilize one or more clustering algorithms to determine a sentiment for a particular conversation between a network device and a bot. For example, the machine learning engine 835 may extract messages exchanged during a conversation between the network device and a bot to identify an anchor or other string of text that may be associated with a polarity. The machine learning engine 835 may determine whether the extracted messages correspond to a particular cluster associated with a known sentiment. The cluster may also be associated with or otherwise used to determine a sentiment score of the user's satisfaction with the conversation. For example, each cluster, in addition to corresponding to a particular sentiment, may be associated with a particular score that may denote a polarity, as described above.

In some implementations, the conversation between the network device and the bot may be transferred automatically to the terminal device without requiring the agent operating the terminal device to evaluate the conversation and manually intervene in the conversation. For instance, if the sentiment score for a particular conversation is below a sentiment score threshold, the bot transfer engine 829 may automatically transfer the conversation from the bot to a terminal device to cause a live agent to intervene in the conversation. In some instances, the bot transfer engine 829 may utilize multiple thresholds to determine whether to present the conversation at the terminal device to allow an agent operating the terminal device to intervene in the conversation or to automatically transfer the conversation to the terminal device. For instance, if the sentiment score for a conversation is below a first sentiment score threshold but not a lower, second sentiment score threshold, the bot transfer engine 829 may present the conversation at the terminal device to allow the agent to intervene in the conversation if so required. However, if the sentiment score is below both the first and second sentiment score thresholds, the bot transfer engine 829 may automatically transfer the conversation to the terminal device for agent intervention.

Feedback module 831 may be configured to, in conjunction with the processor 810, receive feedback on the conversation. The feedback may be provided by an agent operating the terminal device. The feedback may be reflective of how well the bot identified the intent and/or handled the request expressed by the user on the network device. Additionally, the feedback module 831 may obtain feedback from the user engaged in the conversation. For instance, at the end of a conversation, the feedback module 831 may transmit, to the network device utilized by a user, a request to provide feedback with regard to its conversation with the bot and/or live agent. This request may be provided in the form of a survey, through which the user may indicate its sentiment with regard to the conversation, as well as provide a performance evaluation of the bot and/or live agent. In some instances, the feedback module 831 may obtain feedback from the user engaged in the conversation during the conversation. For instance, the feedback module 831 may evaluate user responses during the conversation to determine the sentiment of the user. For example, the feedback module 831 may analyze the textual or non-textual attributes associated with user messages to identify whether the user messages include an anchor associated with a polarity. As an illustrative example, if the user indicates, in a message, that it is "frustrated" or indicates that the proposed solution is incorrect (e.g., a "no" response, etc.), the feedback module 831 may determine that the message represents a negative polarity and, thus, determine that the bot failed to identify the intent and/or handle the request expressed by the user in a satisfactory manner. The feedback may be received in any suitable form. For example, the feedback may be expressed on a letter scale, on a number scale, through words, through selection of icons or graphics, and/or the like. The interface displayed to the agent and/or user to provide the feedback and to render the views of the conversation may be handled by the user interface configuration engine 833 in conjunction with the processor 810.

The machine learning engine 835 may be configured to, in conjunction with the processor 810, feed the conversation, identified intent, and provided feedback into a database and analyze the data to draw inferences about how well a type of bot and/or live agent handled the conversation. This data, along with other historical conversation data and feedback, may be used to build a model that may be used to determine a future intent associated with one or more future requests. For example, if a particular type of bot successfully handled an "order_status" intent to the satisfaction of a user, future "order_status" intents may also be transferred to a bot of the particular type. In addition, future requests stating "I want my order status" may be automatically correlated with the "order_status" intent based on positive feedback. However, if a particular type of bot unsuccessfully handled an intent to the dissatisfaction of the user, future intents similar to the aforementioned intent may be transferred to a terminal device in order for these future intents to be handled by a live agent or to another type of bot that may be better suited to handle the intent based on a confidence score for the other type of bot and calculated based on the intent.

As an example, the first time a user contacts an agent with an intent of "delivery_status", the user may be automatically redirected to an order status bot. An agent may provide feedback on one or more aspects of the interaction, such as whether the order status bot was the appropriate bot to which to transfer the conversation, and whether or not the order status bot was capable of resolving the intent. Further, the user may also provide feedback on similar or different aspects of the interaction, such as whether the order status bot successfully resolved the user's intent, whether the order status bot was responsive to the user's messages, whether responses from the order status bot were relevant to the intent and/or to the particular messages submitted by the user, and the like. Other techniques may be used to collect feedback regarding the interaction without explicit feedback from the agent and/or the user, such as by observing whether or not the agent had to intervene in the conversation, which may indicate that the order status bot was not the correct bot, that the conversation should not have been automatically transferred, or that the order status bot was not capable of resolving the intent. The feedback may be used to train a model that may be applied to future interactions. For example, if it is ascertained that the order status bot was not the appropriate bot, but that another type of bot, such as a shipping status bot, was the appropriate bot, an observed "delivery_status" intent in the future may be transferred to a shipping status bot instead. Feedback may again be collected on the interaction between the user and the shipping status bot to even further refine the model applied to future interactions.

Figure 9:
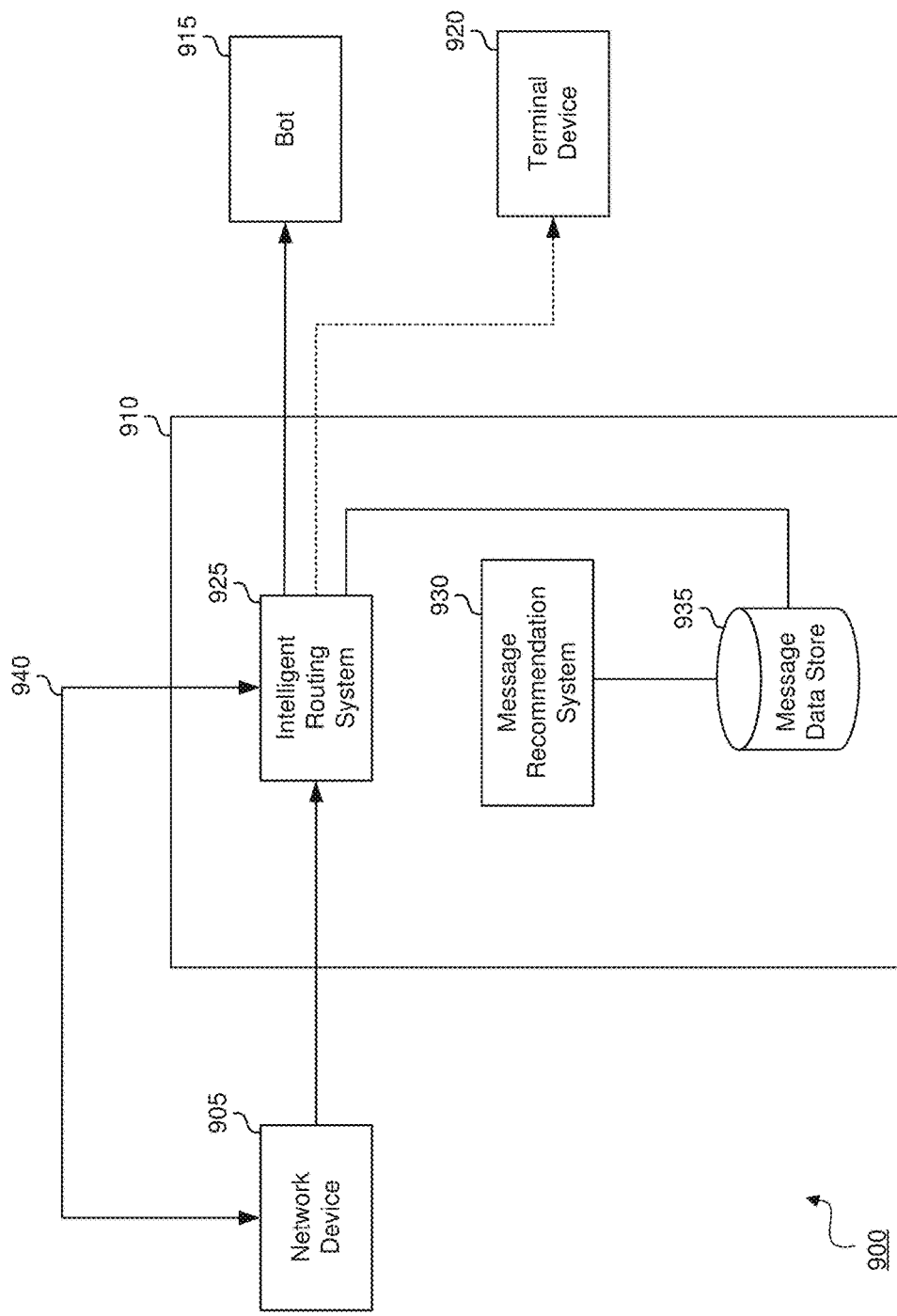
FIG. 9 shows a block diagram representing a network environment for enhancing endpoint selection using machine-learning techniques.

FIG. 9 shows a block diagram representing network environment 900 for enhancing endpoint selection (i.e., a terminal device or a bot) using machine-learning techniques. Network environment 900 may include network device 905 (operated by a user) communication server 910, bot 915 and terminal device 920. Communication server 910 can facilitate the establishment of a communication channel that enables network device 905 and at least one bot 915 and terminal device 920 to communicate.

Communication server 910 may include intelligent routing system 925, message recommendation system 930, and message data store 935. Each of intelligent routing system 925 and message recommendation system 930 may include one or more computing devices with a processor and a memory that execute instructions to implement certain operations. In some implementations, intelligent routing system 925 may be a bot configured to intelligently route communications received from network devices to the appropriate destination. Intelligent routing system 925 may include one or more processors configured to execute code that causes one or more machine-learning techniques or artificial intelligence techniques to intelligently route messages. In some implementations, intelligent routing system 925 can execute one or more machine-learning techniques to train a model that predicts whether a message received from network device 905 may be successfully addressed by a bot 915.

As a non-limiting example, intelligent routing system 925 may receive a message from network device 905 through a communication channel established or facilitated by communication server 910 (e.g., a native application configured to enable users to communicate with each other across various devices). Intelligent routing system 925 may evaluate the incoming message according to certain embodiments described above. For example, intelligent routing system 925 may evaluate the content (e.g., text, audio clips, images, emoticons, or other suitable content) included in the received message using a trained machine-learning model. The content of the message can be inputted into the machine-learning model to generate a predicted destination (e.g., a particular terminal device or bot). The machine-learning model may be continuously trained based on feedback signal 940 received from network device 905. In some implementations, intelligent routing system 925 may request an acknowledgement from network device 905 of the predicted destination. As a non-limiting example, intelligent routing system 925 may evaluate the message using a machine-learning technique, and a result of the evaluation may include a prediction that bot 915 is the destination for the message. To confirm, intelligent routing system 925 may automatically request feedback signal 940. For example, feedback signal 940 may include a request for network device 905 to acknowledge whether bot 915 is the correct destination for the message (e.g., "Is Technical Support the correct destination?"). If network device 905 transmits the acknowledgement that bot 915 is the correct destination (e.g., the destination intended by the user operating network device 905), then intelligent routing system 925 may train the machine-learning model to predict that future messages including the exact or similar content (e.g., a threshold of similarity, such as 10 percent difference in content) as the received message are to be routed to bot 915. However, if intelligent routing system 925 receives feedback signal 940 indicating that bot 915 is not the correct or intended destination for the received message, but rather terminal device 920 is the correct or intended destination, intelligent routing system 925 can train the machine-learning model that future messages including the exact or similar content as the received message are to be routed to terminal device 920 (instead of bot 915). In some implementations, intelligent routing system 925 may not immediately update or train the machine-learning model to route future messages to terminal device 920, but rather, intelligent routing system 925 may wait for a threshold number of incorrect routings to bot 915 before routing all future messages with the exact same or similar content as the received message to terminal device

920. As a non-limiting example, intelligent routing system 925 may begin routing future messages (that were predicted to be routed to bot 915) to terminal device 920 instead of bot 915 after five instances of network devices transmitting feedback signals indicating that bot 915 is not the correct or intended destination.

In some implementations, the intelligent routing system 925 obtains feedback signals 940 from the network device 905 after completion of a conversation with a bot 915 or terminal device 920. For instance, at the conclusion of a conversation between a user and the bot 915 or agent using the terminal device 920, the intelligent routing system 925 may request feedback with regard to the performance of the bot 915 and/or terminal device 920 (e.g., live agent) in handling the intent expressed by the user. The network device 905 may provide, in response to this request, a feedback signal 940 that indicates a user's satisfaction with the handling of the intent by the bot 915 and/or terminal device 920 during the course of the user's conversation. Based on this feedback from the user, the intelligent routing system 925 may update or train the machine learning model. For instance, if the user has expressed dissatisfaction with regard to the conversation with a bot 915, the intelligent routing system 925 may update or train the machine learning model to route future messages having identical or similar intents to the terminal device 920. As another non-limiting example, if the user has expressed satisfaction with regard to the conversation with a bot 915, the intelligent routing system 925 may reinforce the machine learning model to increase the likelihood of routing future messages having identical or similar intents to the bot 915.

In some implementations, the intelligent routing system 925 may implement a confidence score algorithm that is used to calculate a confidence score corresponding to the likelihood or probability of the bot 915 producing a satisfactory response to a given intent. A confidence score may be a percentage or other value where the lower the percentage or value, the less likely the response is a good prediction for an incoming message, and the higher the percentage, the more likely the response is a good prediction for an incoming message. If the user has expressed dissatisfaction with regard to the conversation with a bot 915, the intelligent routing system 925 may update the confidence score algorithm such that, for identical or similar intents, the bot 915 is assigned a lower confidence score, thereby serving as an indication that the identical or similar intents are more likely to be handled properly by the terminal device 920. As another non-limiting example, if the user has expressed satisfaction with regard to the conversation with a bot 915, the intelligent routing system 925 may update the confidence score algorithm such that, for identical or similar intents, the bot 915 is assigned an equal or greater confidence score, thereby serving as an indication that the identical or similar intents are more likely to be handled properly by the bot 915.

In some implementations, the intelligent routing system 925 uses feedback signals 940 from the network device 905 after completion of a conversation with a bot 915 or terminal device 920 to determine whether the network device 905 and the intelligent routing system 925 provided incorrect responses with regard to a destination for a message from the network device 905. For example, if the intelligent routing system 925 initially predicts that bot 915 is the destination for a received message, and the network device 905 provides acknowledgement of this being the correct destination for the message, but later it is determined (such as through later feedback from the network device 905 or as a result of an agent having to intervene in the conversation) that the bot 915 was not the correct destination for the received message, the intelligent routing system 925 may update or train the machine learning model to route future messages having identical or similar intents to the terminal device 920. Further, the intelligent routing system 925 may forego using acknowledgements with regard to predictions corresponding to identical or similar intents to train the machine learning model and may instead await post-conversation feedback from the network device 905 to train or update the machine learning model.

Message data store 935 may store some or all messages received in the past from one or more network devices. Further, message data store 935 may also store some or all messages transmitted by terminal devices or bots during previous communication sessions with network devices. Message data store 935 may also store some or all messages transmitted by network devices to bots during communication sessions. Further, message data store 935 may store some or all messages transmitted by bots to network devices during communication sessions. In some implementations, message data store 935 may be a database of all messages processed (e.g., transmitted by or received at) communication server 910.

Message recommendation system 930 may analyze the database of messages stored at message data store 935. In some implementations, message recommendation system 930 may evaluate the messages stored at message data store 935 using one or more machine-learning algorithms or artificial intelligence algorithms. For example, message recommendation system 930 may execute one or more clustering algorithms, such as K-means clustering, means-shift clustering, Density-Based Spatial Clustering of Applications with Noise (DBSCAN) clustering, Expectation-Maximization (EM) Clustering using Gaussian Mixture Models (GMM), and other suitable machine-learning algorithms, on the database of messages stored in message data store 935. In some implementations, a recurrent neural network (RNN) or a convolutional neural network (CNN) may be used to predict response messages to assist the agent. In some implementations, message recommendation system 930 may use support vector machines (SVM), supervised, semi-supervised, ensemble techniques, or unsupervised machine-learning techniques to evaluate all previous messages to predict responses to incoming messages received from network devices during communication sessions. For example, message recommendation system 930 may evaluate the content of messages received from network devices (or messages received at communication server 910 from bots or terminal devices) and compare the results of the evaluation to the one or more clusters of previous messages stored in message data store 935. Once the cluster is identified, message recommendation system 930 can identify the most relevant response messages based on a confidence threshold. For example, an incoming message (e.g., received at communication server 910 from network device 905) may correspond to a technical issue based on the content of the incoming message. Message recommendation system 930 can identify that the incoming message corresponds to a technical issue based on an evaluation of the content of the incoming message (e.g., text evaluation). Message recommendation system 930 can access message data store 935 to identify the cluster of messages associated with technical issues. Message recommendation system 930 can select one or more response messages within the cluster of messages based on a confidence threshold. As a non-limiting example, a confidence algorithm can be executed to generate a confidence score. A confidence score may be a percentage value where the lower the percentage, the less likely the response is a good prediction for the incoming message, and the higher the percentage, the more likely the response is a good prediction for the incoming message. A minimum confidence threshold may be defined as a measure of certainty or trustworthiness associated with each discovered pattern. Further, an example of a confidence algorithm may be the Apriori Algorithm, similarity algorithms indicating similarity between two data sets, and other suitable confidence algorithms.

In some implementations, the message recommendation system 930 provides the most relevant response messages to the bot 915 or terminal device 920 (e.g., live agent) for use in the conversation with the network device 905. The bot 915 may select, from the response messages provided by the message recommendation system 930, the response message having the highest confidence score. The bot 915 may provide this response to the network device 905 as part of the conversation. In some instances, the message recommendation system 930 may monitor the conversation to identify a reaction to the selected response message by the user of the network device 905. For instance, the message recommendation system 930 may use the reaction (e.g., messages submitted in response to the selected response message) to further train the one or more clustering algorithms. As an illustrative example, if the bot 915 submits a response message that is negatively received by the user of the network device 905, the message recommendation system 930 may update the clustering algorithms to reduce the likelihood (e.g., confidence score) of the particular response message being selected for an identical or similar incoming message from a network device. Alternatively, if the bot 915 submits a response message that is positively received by the user of the network device 905, the message recommendation system 930 may update the clustering algorithms to further reinforce selection of the particular response message for identical or similar incoming messages.

If the most relevant response messages are provided to a terminal device 920, these most relevant response messages may be presented to an agent using the terminal device 920 for selection and incorporation into a conversation between the terminal device 920 and the network device 905. The agent may elect to select a particular response message for use in the conversation or ignore the response messages presented to the agent. If the agent selects a response message from those provided by the message recommendation system 930, the message recommendation system 930 may monitor the conversation to identify a reaction to the selected response message by the user of the network device 905, as described above. However, if the agent ignored the response messages provided by the message recommendation system 930 and provides its own response message to the network device 905, the message recommendation system 930 may record this response message and associate this response message to the identified technical issue. Further, the message recommendation system 930 may monitor the conversation to determine the user's sentiment with regard to the submitted response message. If the response message submitted by the agent is positively received by the user, the message recommendation system 930 may update the clustering algorithms to associate the response message with a cluster corresponding to the identified technical issue. However, if the response message submitted by the agent is negatively received by the user, the message recommendation system 930 may evaluate the response message to determine whether the response message can be associated with an alternative cluster or otherwise disassociate the response message from the cluster corresponding to the identified technical issue.

Figure 10A:
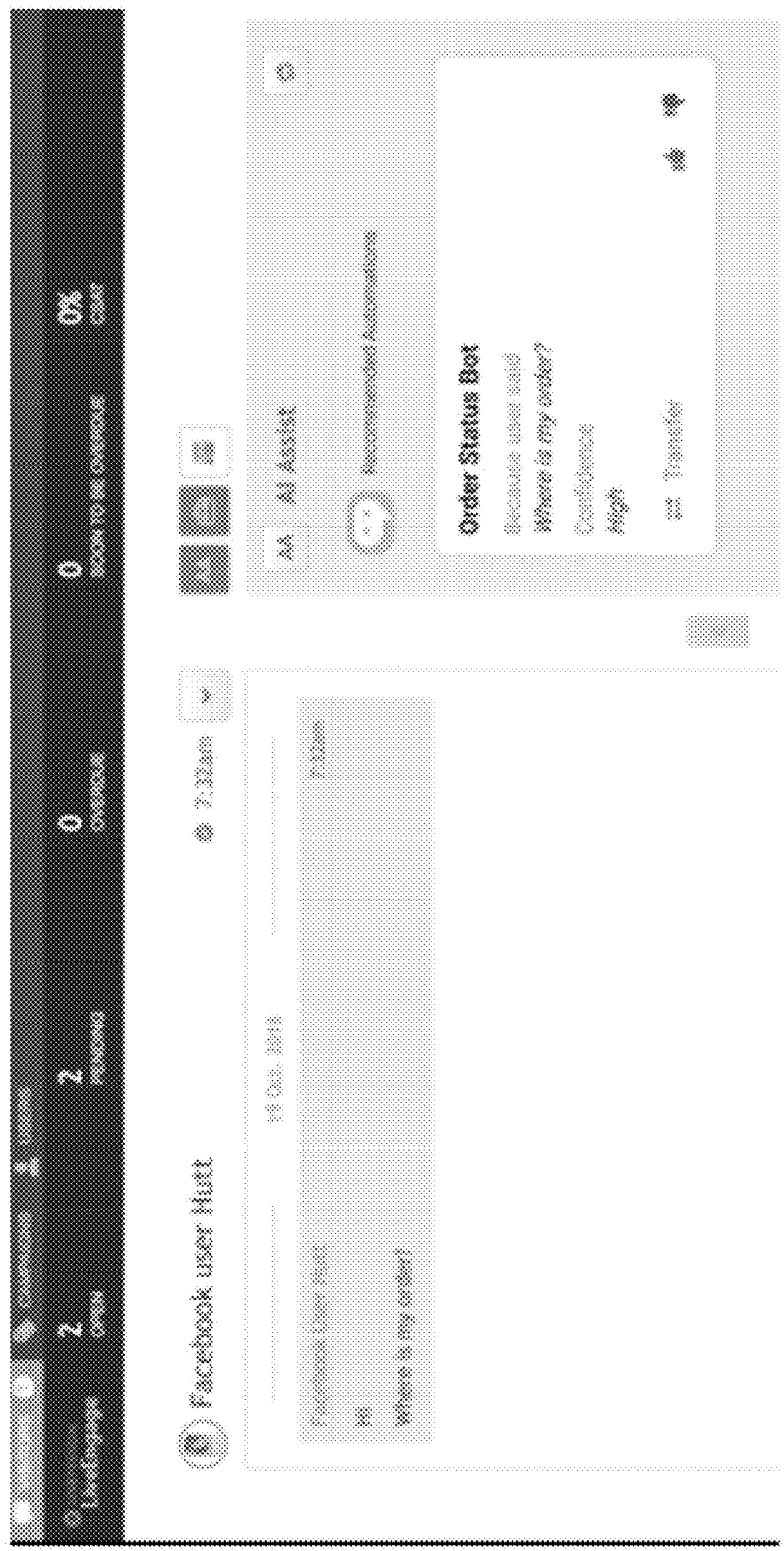
FIGS. 10A-10G are screenshots of user interfaces for transferring messaging to automation.

FIG. 10A illustrates an exemplary screen shot of an interface that may be displayed on a terminal device in accordance with some embodiments. A user-initiated conversation may appear on a portion of a screen. For example, the user may operate a network device to say "Hi. Where is my order?" The terminal device and/or a bot may analyze the request to determine an intent, e.g., order status. The order status bot may be displayed as a widget that recommends that the conversation be transferred to automation. The widget may further display a confidence that the intent may be successfully addressed by the bot. For instance, the widget may display a confidence score or rating that may be indicative of the confidence that the intent may be successfully addressed by the bot. As illustrated in FIG. 10A, the confidence score or rating for the order status bot is presented as being "High," which may denote a high likelihood that the order status bot may successfully address the intent. In some instances, the widget may further display an explanation or justification for selection of the particular bot for the intent. For instance, as illustrated in FIG. 10A, the order status bot is selected because the user explicitly said "Where is my order?". This may provide an agent with appropriate context with regard to the selection of the particular bot. The widget may further display an interactive element (e.g., a button) allowing the agent to transfer the conversation to a bot, as well as other interactive elements allowing the agent to provide feedback on the recommendation. Although shown as being initiated as a manual transfer, it is contemplated that in some embodiments, the conversation may be automatically transferred to the bot.

In some implementations, the terminal device through which the interface is displayed may be selected from among a set of terminal devices (e.g., agents) based on one or more characteristics of the request submitted by the user. For instance, a terminal device may be selected based on a corresponding agent's likelihood to address the determined intent in a positive manner that leads to a positive user experience. For example, as described above, the characteristics of the messages received from a network device and the technical issue expressed by the user of the network device may be used as input to a machine learning model or artificial intelligence algorithm configured to provide, as output, selection of a particular agent. The machine learning model or artificial intelligence algorithm may select a particular agent that may provide an increased likelihood of a positive user experience. The interface may be provided to the terminal device associated with the selected agent such that the selected agent is presented with the user request and the aforementioned widget.

Figure 10B:
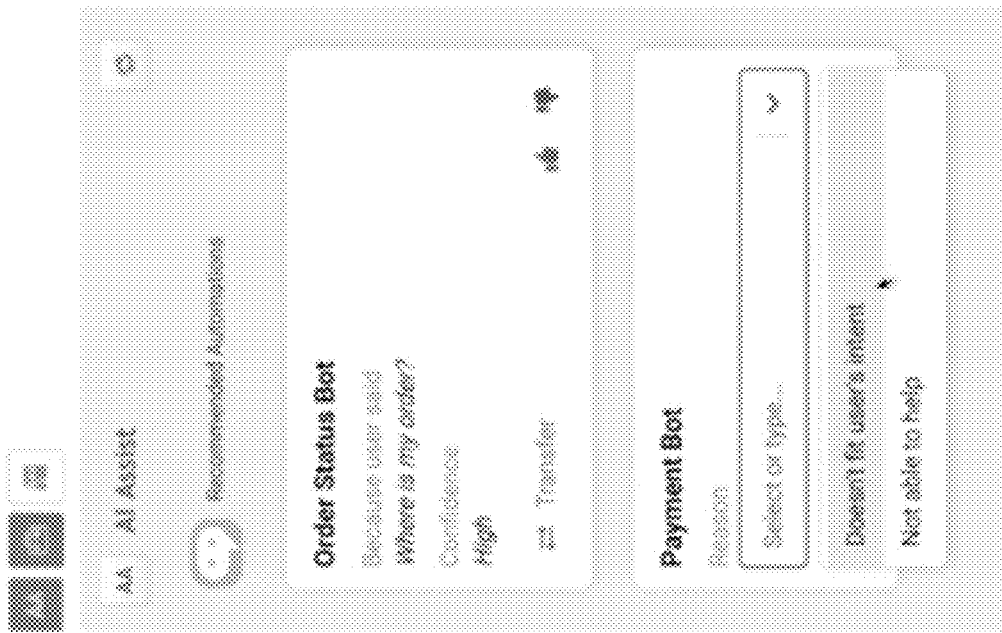

FIG. 10B illustrates an exemplary screen shot of an interface that may be displayed on a terminal device in order to receive feedback in accordance with some embodiments. For the request, "Where is my order?", two automations may be recommended: an order status bot and a payment bot. An agent may select negative feedback on the payment bot and select that the payment bot doesn't fit the user's intent. This feedback may be used by a machine learning engine to better refine which bots are recommended for transfer in the future.

Figure 10C:
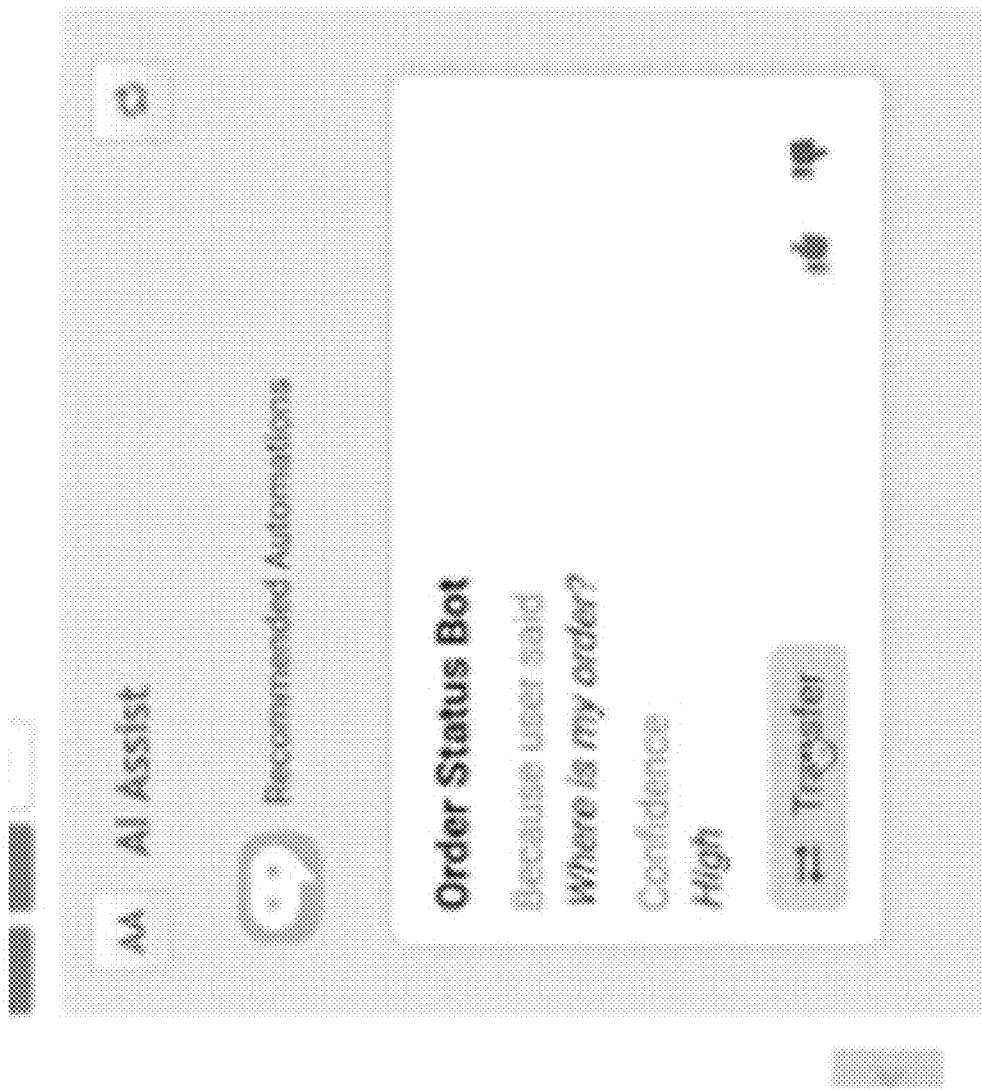

FIG. 10C illustrates an exemplary screen shot of an interface that may be displayed on a terminal device to transfer a conversation to automation in accordance with some embodiments. An agent operating the terminal device may select an interactive element (e.g., a button) with a transfer option in order to transfer the conversation from the terminal device to a bot.

Figure 10D:
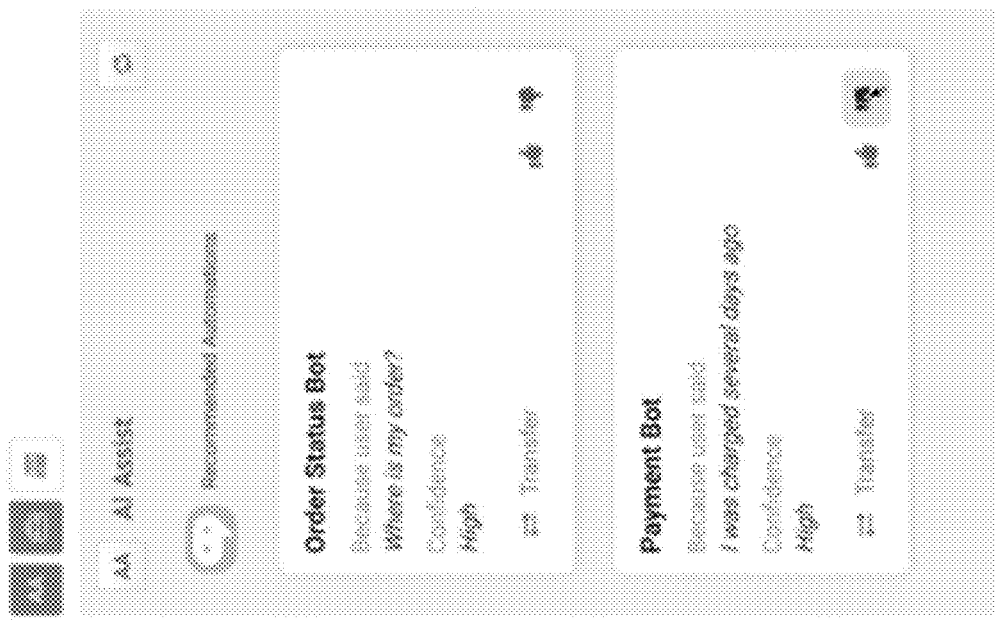

FIG. 10D illustrates an exemplary screen shot of an interface that may be displayed on a terminal device to recommend different types of bots and receive feedback according to some embodiments. A request may be received stating "Where is my order? I was charged several days ago." Two different types of bots may be recommended to which to transfer the conversation: an order status bot and a payment bot. Although the request does discuss payment, the intent of the conversation is about order status and not payment. Thus, the agent may provide negative feedback on the recommendation to transfer the conversation to a payment bot. The negative feedback may be used by a machine learning engine to better ascertain future intents and to make better recommendations for automations.

In an embodiment, each recommendation further includes a confidence score corresponding to the likelihood that a particular type of bot will be able to handle the identified intent in a satisfactory manner. As noted above, a confidence score algorithm may be used to calculate a confidence score corresponding to the likelihood or probability of a particular type of bot producing a satisfactory response to an identified intent. As illustrated in FIG. 10D, the confidence score or rating for an order status bot is presented as being "High," which may denote a high likelihood that an order status bot may successfully address an identified intent. Similarly, the confidence score or rating for a payment bot is presented as being "High" for a different intent.

In some instances, the agent may be provided with an explanation or justification for presentation of the different types of bots for the identified one or more intents. For instance, as illustrated in FIG. 10D, an order status bot is selected because the user explicitly said "Where is my order?". Further, a payment bot is selected because the user explicitly said "I was charged several days ago," This may provide an agent with appropriate context with regard to the identification of the different types of bots in response to a given request from a user from which different intents were identified. The widget may further display an interactive element (e.g., a button) allowing the agent to transfer the conversation to a bot, as well as other interactive elements allowing the agent to provide feedback on the recommendations.

As noted above, the agent may provide negative feedback on a recommendation to transfer the conversation to a particular type of bot. The negative feedback may be used by a machine learning engine to better ascertain future intents and to make better recommendations for types of bots that may be capable to handle these future intents. For instance, if the agent indicates that a particular type of bot is not suited to handle the actual intent associated with a particular message or request submitted by a user, the feedback may be used to train or otherwise update one or more machine learning algorithms or artificial intelligence configured to identify, from a given communication session, the intent of a user and, based on this intent, one or more types of bots that may be able to handle the intent. In some instances, the one or more machine learning algorithms or artificial intelligence may be updated such that a confidence score for the particular type of bot determined to be ill-suited for a particular intent is reduced for the particular type of bot for identical or similar intents.

In some implementations, the recommendations provided via the interface are selected based on the corresponding confidence scores of the different types of bots for the identified intents. For instance, a particular recommendation presented via the interface may correspond to a particular type of bot that has a highest confidence score for an identified intent. In some instances, recommendations may be provided for different types of bots having confidence scores that exceed a threshold value for a particular intent. This may provide an agent with additional options for selection of a particular type of bot for an obtained request.

Figure 10E:
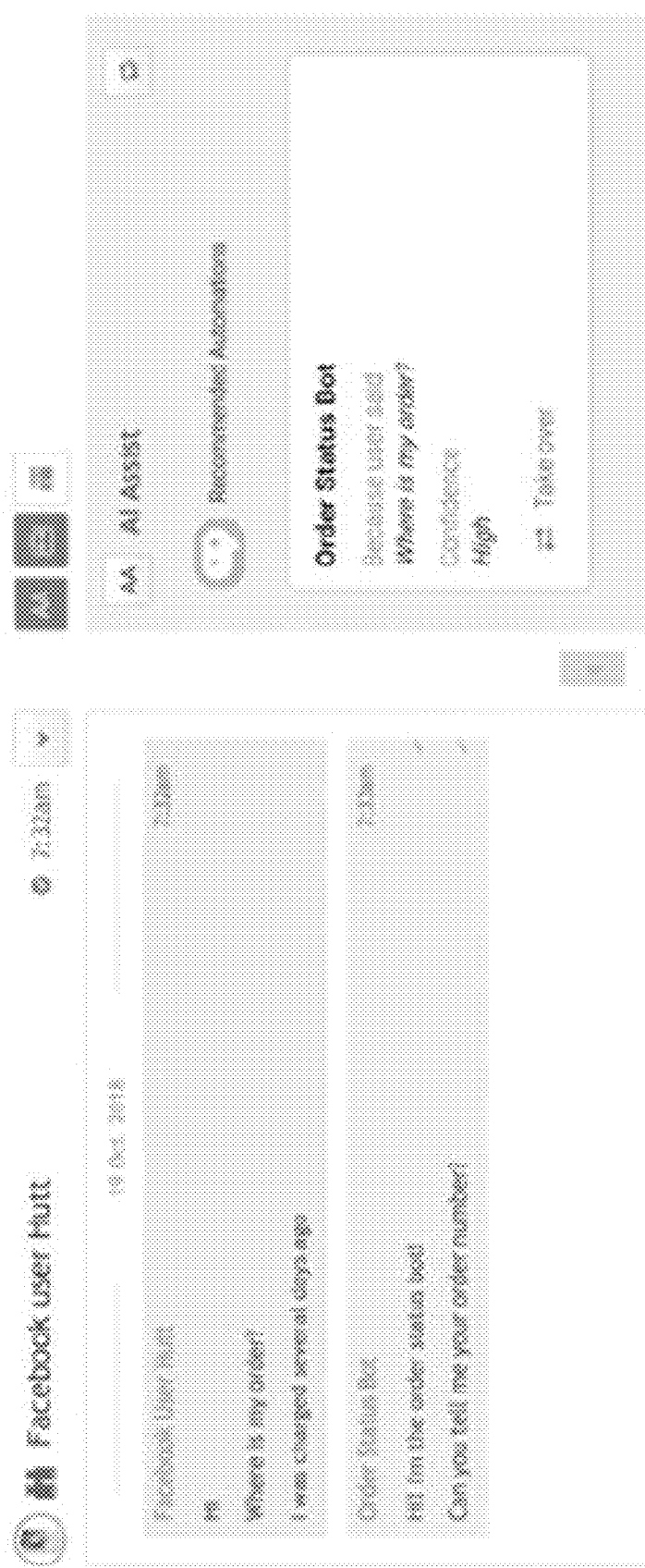

FIG. 10E illustrates an exemplary screen shot of an interface that may be displayed on a terminal device after a conversation has been transferred to automation according to some embodiments. The agent may select the interactive element corresponding to transfer in order to move the conversation to the order status bot. However, the conversation between the user and the bot may still be displayed on the terminal device so that the agent may "rescue" the conversation if needed, i.e., intervene for any reason, such as dissatisfaction by the user. For instance, if the agent determines that the user is responding negatively to the response messages provided by the bot, the agent may select an interactive element of the bot widget to intervene in the conversation and provide its own response messages to the user. In some instances, a communication server, as described above, may also monitor the conversation between the user and the bot to determine whether the agent is required to intervene in the conversation. For example, if the communication server determines that the user is responding negatively to the response messages submitted by the bot, the communication server may update the bot widget to indicate a reduced confidence rating or score for the bot (e.g., change the confidence from "High" to a lower value, etc.). This may serve as an indication to the agent that the bot's performance is degrading with regard to the particular conversation. In some instances, if the confidence rating or score for the bot falls below a particular threshold value, the communication server may automatically transfer the conversation to the agent. Through the interface, the communication server may alert the agent of this transfer, which may prompt the agent to intervene in the conversation.

Figure 10F:
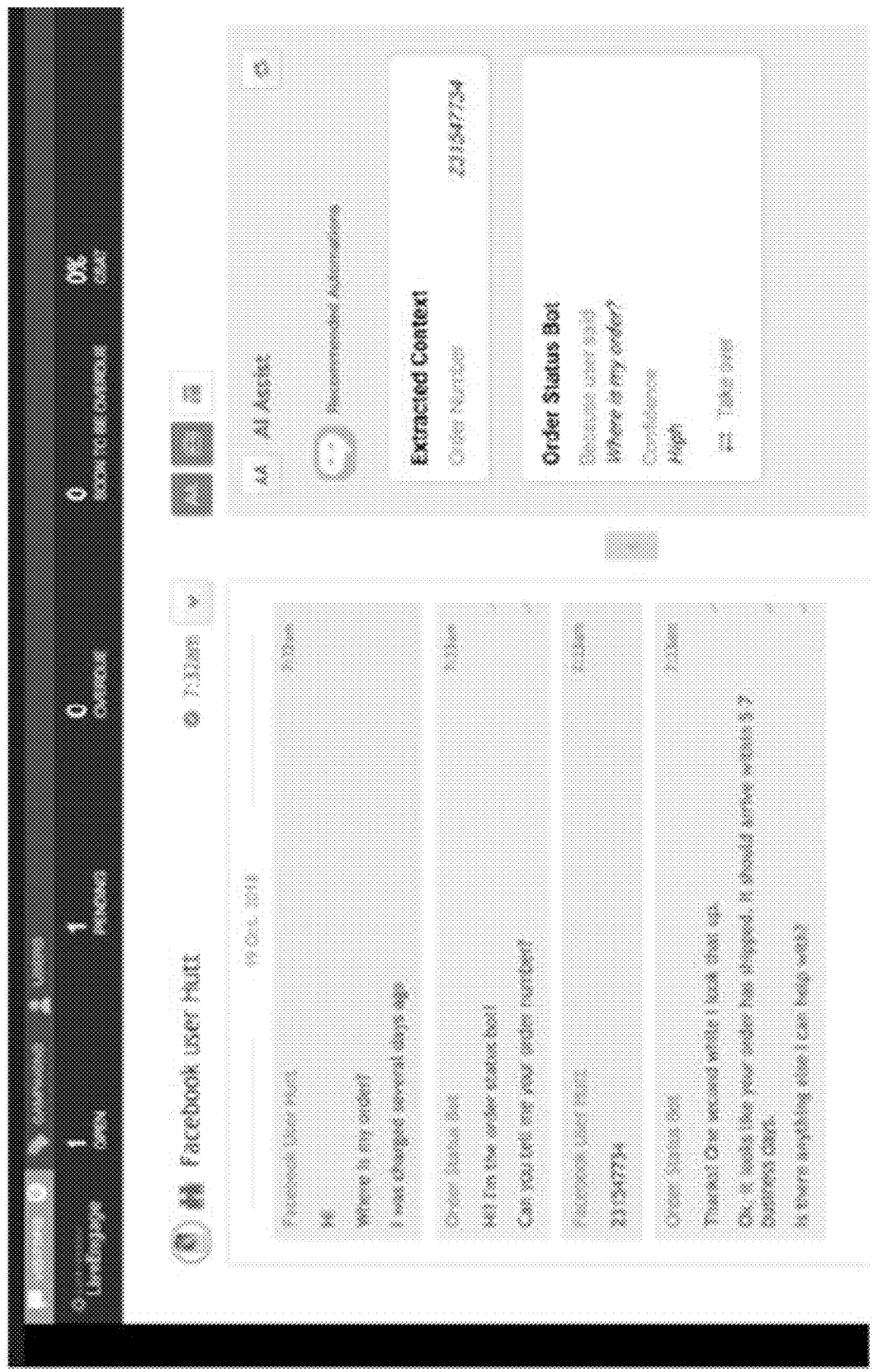
Figure 10G:
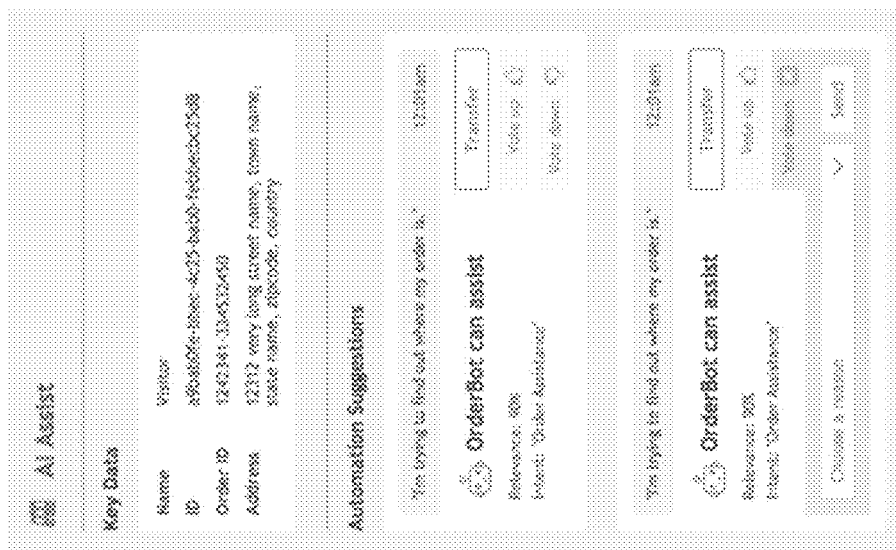

FIG. 10F illustrates an entire conversation displayed between the user and the bot. FIG. 10G illustrates an alternate screen shot of an interface that may be displayed on a terminal device with automation recommendations. In FIG. 10G, a confidence level is displayed as "relevance" and an accompanying percentage. In addition to the confidence level, the interface may include one or more interactive elements that may be used by an agent to indicate whether a bot recommendation is appropriate for the identified intent. For instance, as illustrated in FIG. 10G, the interface may include, for each automation (e.g., bot) recommendation, a "vote up" button and a "vote down" button. Selection of the "vote up" button for a particular recommendation may serve as an indication that the selection of the particular bot for the identified intent is appropriate or correct. This feedback may be used to train or update a machine learning model or artificial intelligence algorithm to further reinforce selection of the particular bot for identical or similar intents. However, selection of the "vote down" button for a particular recommendation may serve as an indication that the selection of the particular bot for the identified intent is inappropriate or incorrect. This feedback may be used to train or update the machine learning model or artificial intelligence algorithm to decrease the likelihood of selection of the particular bot for identical or similar intents.

The interface may further include a drop down menu or other option to allow an agent to provide a justification for selection of a vote down button for a particular recommendation. The drop down menu or other option may include one or more pre-defined responses that the agent may select from. Additionally, or alternatively, the interface may include an option for an agent to provide its own justification for selection of the vote down button or forego providing a justification altogether. A response provided by the agent may be used to further train or update the machine learning model or artificial intelligence algorithm such that the particular bot is less likely to be selected for the particular intent.

Figure 11:
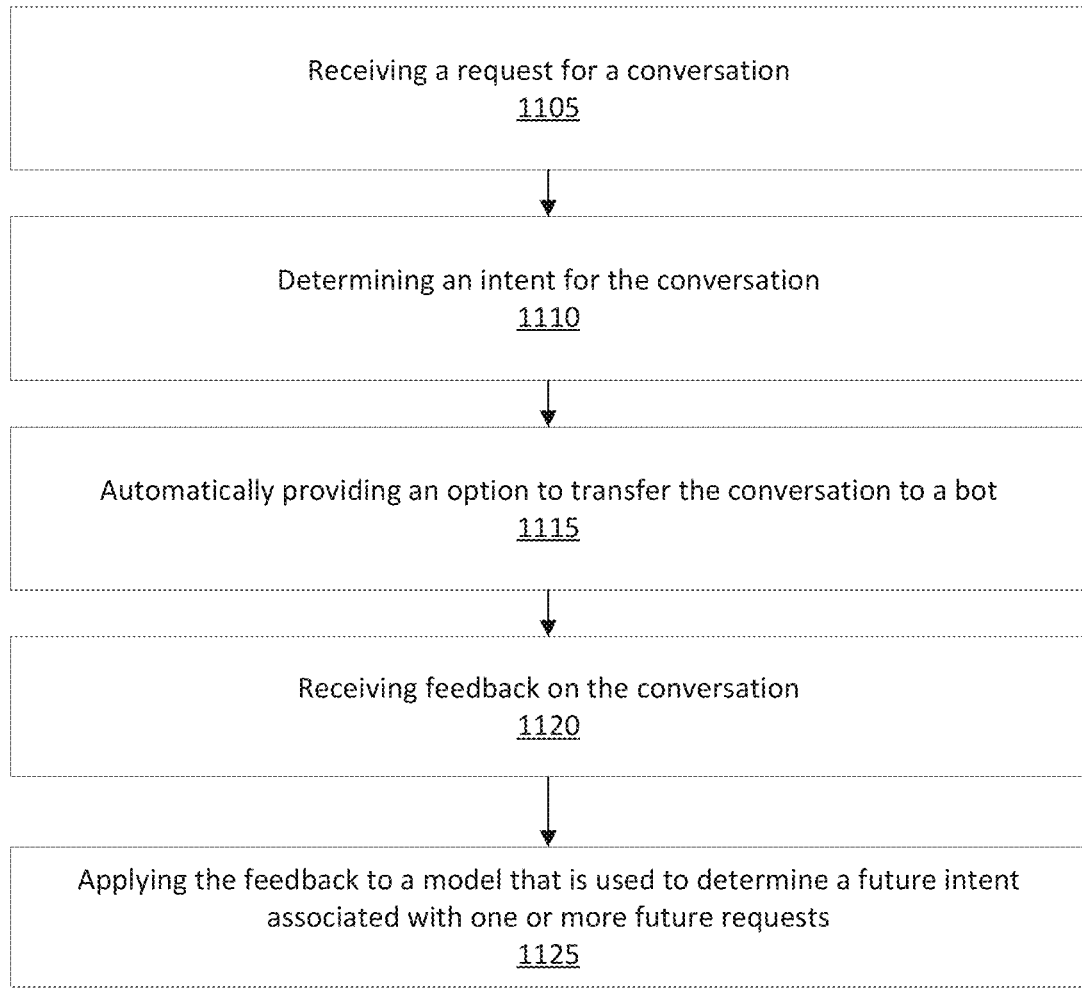
FIG. 11 is a flowchart of a method for transferring messaging to automation.

FIG. 11 is a flowchart of a method for transferring messaging to automation. At step 1105, a request for a conversation may be received. The request may be initiated by at a network device by a user seeking assistance or some other conversation with an agent operating a terminal device. The request may be received in natural language, by selection of an interactive element, or by any other suitable method.

At step 1110, an intent for the conversation may be determined. The intent may be determined by analyzing the request. For example, if the request is received in natural language, it may be parsed to determine keywords in the request and to disregard other language. In another example, the request may be compared to a database of intents to determine the closest intent to the request. In some embodiments, machine learning may be used to identify intents associated with requests.

At step 1115, based on the intent, an option to transfer the conversation to a bot may be automatically provided. When the option is selected, the conversation with the bot may be facilitated. For example, if the intent is one that has been successfully handled in the past by a bot (as determined from a machine learning model of feedback received in the past), an option may be automatically provided on a terminal device to transfer that conversation based on a high probability of success. The probability of success may be expressed as a confidence score or relevance score, as discussed further herein, and may be presented in any suitable form. In some embodiments, during the conversation, a sentiment score may be calculated based on the conversation between the network device and the bot. The sentiment score may be a score reflective of the user's satisfaction with the conversation. In some embodiments, if the sentiment score is below a threshold, the conversation may be transferred back to the terminal device.

At step 1120, feedback on the conversation may be received. For example, an agent may continue to watch the conversation between the user of a network device and the bot and may provide feedback on various aspects of the interaction. For example, the agent may provide feedback on the identification of the intent based on the language of the request. The agent may further provide feedback on whether or not a recommendation to transfer a conversation to automation is appropriate, and/or whether or not a recommendation to transfer a conversation to a particular bot is appropriate. The agent may further provide feedback on how well a bot addressed the request based on, for example, user satisfaction.

At step 1125, the feedback may be applied to a model that is used to determine a future intent associated with one or more future requests. For example, feedback on identification of the intent from the request may be used to further refine a model used to identify intents according to machine learning. Feedback on whether to transfer a conversation to automation may be used to identify future conversations that should or should not be transferred to automation. Feedback on whether to transfer a conversation to a specific bot may be used to identify whether that particular bot should be recommended in the future, and so on and so forth.

Specific details are given in the above description to provide a thorough understanding of the embodiments. However, it is understood that the embodiments can be practiced without these specific details. For example, circuits can be shown as block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that portions of the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method, comprising:
determining an intent associated with a conversation, wherein messages are exchanged in real-time during the conversation, and wherein the conversation is associated with a terminal device;
receiving the messages in real-time as the messages are exchanged;
using the intent and the messages as input to a trained machine learning model to generate a recommended response message, wherein the trained machine learning model identifies a cluster of messages based on the intent, and wherein the recommended response message is generated as a result of a confidence score associated with the recommended response message satisfying a confidence threshold;
providing the recommended response message, wherein when the recommended response is received at the terminal device, an agent associated with the terminal device determines whether to communicate the recommended response message or an alternative response message;
dynamically determining feedback corresponding to an actual response message exchanged during the conversation, wherein the actual response message includes either the recommended response message or the alternative response message;
determining a polarity for the conversation based on the feedback; and
updating the trained machine learning model using the intent, the actual response message, and the polarity to determine new recommended response messages, wherein the trained machine learning model is updated by modifying the identified cluster of messages according to the actual response message, the polarity, and the feedback.

2. The computer-implemented method of claim 1, further comprising:
recording messages corresponding to the agent during the conversation; and
associating the messages corresponding to the agent with the intent based on the polarity for the conversation.

3. The computer-implemented method of claim 1, wherein the terminal device is selected based on a likelihood of the terminal device to provide a positive experience during the conversation.

4. The computer-implemented method of claim 1, wherein the feedback corresponding to the conversation includes textual and non-textual attributes associated with the messages exchanged during the conversation.

5. The computer-implemented method of claim 1, wherein the intent is associated with a request for the conversation, and wherein the request is in a natural language.

6. The computer-implemented method of claim 1, wherein the polarity for the conversation is determined using another trained machine learning model, and wherein the other trained machine learning model is trained to determine the polarity as the messages are exchanged in the conversation.

7. The computer-implemented method of claim 1, wherein the feedback is dynamically determined by monitoring the conversation to identify a reaction to the actual response message, and wherein the reaction is used to determine the polarity for the conversation.

8. A system, comprising:
one or more processors; and
memory storing thereon instructions that, as a result of being executed by the one or more processors, cause the system to:
determine an intent associated with a conversation, wherein messages are exchanged in real-time during the conversation, and wherein the conversation is associated with a terminal device;
receive the messages in real-time as the messages are exchanged;
use the intent and the messages as input to a trained machine learning model to generate a recommended response message, wherein the trained machine learning model identifies a cluster of messages based on the intent, and wherein the recommended response message is generated as a result of a confidence score associated with the recommended response message satisfying a confidence threshold;
provide the recommended response message, wherein when the recommended response is received at the terminal device, an agent associated with the terminal device determines whether to communicate the recommended response message or an alternative response message;
dynamically determine feedback corresponding to an actual response message exchanged during the conversation, wherein the actual response message includes either the recommended response message or the alternative response message;
determine a polarity for the conversation based on the feedback; and
update the trained machine learning model using the intent, the actual response message, and the polarity to determine new recommended response messages, wherein the trained machine learning model is updated by modifying the identified cluster of messages according to the actual response message, the polarity, and the feedback.

9. The system of claim 8, wherein the instructions further cause the system to:
record messages corresponding to the agent during the conversation; and
associate the messages corresponding to the agent with the intent based on the polarity for the conversation.

10. The system of claim 8, wherein the terminal device is selected based on a likelihood of the terminal device to provide a positive experience during the conversation.

11. The system of claim 8, wherein the feedback corresponding to the conversation includes textual and non-textual attributes associated with the messages exchanged during the conversation.

12. The system of claim 8, wherein the intent is associated with a request for the conversation, and wherein the request is in a natural language.

13. The system of claim 8, wherein the polarity for the conversation is determined using another trained machine learning model, and wherein the other trained machine learning model is trained to determine the polarity as the messages are exchanged in the conversation.

14. The system of claim 8, wherein the feedback is dynamically determined by monitoring the conversation to identify a reaction to the actual response message, and wherein the reaction is used to determine the polarity for the conversation.

15. A non-transitory, computer-readable storage medium storing thereon executable instructions that, as a result of being executed by one or more processors of a computer system, cause the computer system to:
  determine an intent associated with a conversation, wherein messages are exchanged in real-time during the conversation, and wherein the conversation is associated with a terminal device;
  receive the messages in real-time as the messages are exchanged;
  use the intent and the messages as input to a trained machine learning model to generate a recommended response message, wherein the trained machine learning model identifies a cluster of messages based on the intent, and wherein the recommended response message is generated as a result of a confidence score associated with the recommended response message satisfying a confidence threshold;
  provide the recommended response message, wherein when the recommended response is received at the terminal device, an agent associated with the terminal device determines whether to communicate the recommended response message or an alternative response message;
  dynamically determine feedback corresponding to an actual response message exchanged during the conversation, wherein the actual response message includes either the recommended response message or the alternative response message;
  determine a polarity for the conversation based on the feedback; and
  update the trained machine learning model using the intent, the actual response message, and the polarity to determine new recommended response messages, wherein the trained machine learning model is updated by modifying the identified cluster of messages according to the actual response message, the polarity, and the feedback.

16. The non-transitory, computer-readable storage medium of claim 15, wherein the executable instructions further cause the computer system to:
  record messages corresponding to the agent during the conversation; and
  associate the messages corresponding to the agent with the intent based on the polarity for the conversation.

17. The non-transitory, computer-readable storage medium of claim 15, wherein the terminal device is selected based on a likelihood of the terminal device to provide a positive experience during the conversation.

18. The non-transitory, computer-readable storage medium of claim 15, wherein the feedback corresponding to the conversation includes textual and non-textual attributes associated with the messages exchanged during the conversation.

19. The non-transitory, computer-readable storage medium of claim 15, wherein the intent is associated with a request for the conversation, and wherein the request is in a natural language.

20. The non-transitory, computer-readable storage medium of claim 15, wherein the polarity for the conversation is determined using another trained machine learning model, and wherein the other trained machine learning model is trained to determine the polarity as the messages are exchanged in the conversation.

21. The non-transitory, computer-readable storage medium of claim 15, wherein the feedback is dynamically determined by monitoring the conversation to identify a reaction to the actual response message, and wherein the reaction is used to determine the polarity for the conversation.

* * * * *